US012804340B2

(12) United States Patent
Li et al.

(10) Patent No.: US 12,804,340 B2
(45) Date of Patent: Nov. 17, 2026

(54) METHOD AND DEVICE FOR DETECTING STATE OF EARPHONE BASED ON MULTIPLE SENSORS

(71) Applicant: LITTLE BIRD CO., LTD, Beijing (CN)

(72) Inventors: Bo Li, Beijing (CN); Na Li, Beijing (CN)

(73) Assignee: LITTLE BIRD CO., LTD, Beijing (CN)

( * ) Notice: Subject to any disclaimer, the term of this patent is extended or adjusted under 35 U.S.C. 154(b) by 175 days.

(21) Appl. No.: 18/770,490

(22) Filed: Jul. 11, 2024

(65) Prior Publication Data

US 2025/0024214 A1 Jan. 16, 2025

(30) Foreign Application Priority Data

Jul. 14, 2023 (CN) ......................... 202310870072.0

(51) Int. Cl.

| | |
|---|---|
| ***H04R 1/10*** | (2026.01) |
| ***G10L 21/0324*** | (2013.01) |
| ***G10L 21/0388*** | (2013.01) |
| ***H04R 29/00*** | (2006.01) |

(52) U.S. Cl.

CPC ........ *H04R 29/001* (2013.01); *G10L 21/0324* (2013.01); *G10L 21/0388* (2013.01); *H04R 1/1083* (2013.01)

(58) Field of Classification Search

CPC .... H04R 29/00; H04R 29/001; H04R 1/1041; H04R 1/1083; H04R 1/1016

See application file for complete search history.

(56) References Cited

U.S. PATENT DOCUMENTS

| | | | | |
|---|---|---|---|---|
| 11,336,987 | B2 * | 5/2022 | Liu | H04R 1/1016 |
| 11,842,717 | B2 * | 12/2023 | He | G10K 11/17815 |
| 12,262,184 | B2 * | 3/2025 | Yu | G10K 11/178 |
| 2021/0195311 | A1 | 6/2021 | Jiao | |
| 2023/0000420 | A1 | 1/2023 | Lesso | |
| 2024/0187778 | A1 * | 6/2024 | Zhao | H04R 1/1083 |

FOREIGN PATENT DOCUMENTS

| | | | |
|---|---|---|---|
| CN | 114697849 | A | 7/2022 |
| EP | 3799442 | A1 | 3/2021 |

OTHER PUBLICATIONS

Supplementary European Search Report in the European application No. 24187963.4, mailed on Dec. 13, 2024, 10 pages.

* cited by examiner

*Primary Examiner* — Disler Paul
(74) *Attorney, Agent, or Firm* — Syncoda LLC; Feng Ma

(57) ABSTRACT

A method, a device, and a storage medium involve detecting a state of an earphone based on multiple sensors. The earphone includes a loudspeaker located in an auditory canal, a first voice pickup sensor located in the auditory canal and disposed near the loudspeaker, and a second voice pickup sensor located outside the auditory canal. The method includes: first earphone state information is acquired according to a source audio signal input to the loudspeaker and a first audio signal picked up by the first voice pickup sensor; second earphone state information is acquired according to a second audio signal picked up by the second voice pickup sensor and the first audio signal picked up by the first voice pickup sensor; and a final detection result of the state of the earphone is output based on the first earphone state information and second earphone state information.

17 Claims, 11 Drawing Sheets

METHOD AND DEVICE FOR DETECTING STATE OF EARPHONE BASED ON MULTIPLE SENSORS

CROSS-REFERENCE TO RELATED APPLICATION

The present application claims priority to Chinese Patent Application No. 202310870072.0 filed on Jul. 14, 2023, the disclosure of which is hereby incorporated by reference in its entirety.

TECHNICAL FIELD

The present disclosure relates to the technical field of wearing state detection for wearable devices, and in particular to a method and device for detecting a state of an earphone based on multiple sensors.

BACKGROUND

Earphones are more and more widely used in our daily life because of their small sizes and portability. For example, the earphones may be used for listening to music, watching movies, etc., thus, the listening effect of the earphones is very important to users. Most manufacturers pay more attention to quality of earphones, while they ignore impact of the wearing state of the earphones (i.e., a coupling state between the earphones and an auditory canal) on the listening effect. If the earphones are worn loosely, the poor coupling between the earphones and the auditory canal can lead to low-frequency leakage, which severely affects the listening effect at low frequencies. If the earphones are worn tightly, the good coupling between the earphones and the auditory canal keeps the low frequency experience maintained, which allows users to experience better listening effect.

In addition, as for active noise canceling earphones, the coupling between the earphones and the auditory canal may also affect the noise reduction effect. Therefore, it is also required to select appropriate noise reduction filters under different coupling conditions, to obtain a better noise reduction effect, or to perform audio compensation, etc. In particular, when an earphone is in an abnormal state, such as being put in a pocket or held in hand, the earphone is squeezed, causing squeal in the earphone, which is also a noise pollution to human ears. Therefore, it is also expected to avoid the squeal when the earphone is in the abnormal state.

The existing methods for detecting the state of the earphone may include: inserting an infrasound signal that is not easy to be perceptible to human ears into an audio signal sent to a loudspeaker/reproducer, and further detecting a amplitude of the infrasound by using a microphone in the auditory canal to determine the current low-frequency leakage, so as to detect the wearing state of earphones. In addition, the existing methods may also include detecting the wearing state of earphones according to a difference between weighted sums of amplitudes for low-frequency bands of a source audio signal and an audio signal collected by a feedback microphone. These methods are nothing more than using changes of the absolute amplitudes for the low-frequency bands to determine the wearing state. They have disadvantages of poor anti-noise performance (high external noises may bring great difficulties for detection), and poor adaptive capability to different people and different scenarios. In addition, these methods mainly use a single relationship between two signals (the input audio signal and the signal collected by the microphone in the auditory canal) for state detection. However, in practical applications, the scenarios where the earphones are located may be very complex, for example, there may be a variety of played audio signals and external noise conditions; there may be no audio signal, or the environment may be very noisy. In such conditions, only the single relationship between two signals is not sufficient for obtaining an effective wearing state.

SUMMARY

Embodiments of the present disclosure provide a method and a device for detecting a state of an earphone based on multiple sensors, with the aim of improving accuracy of detection of the state of the earphone in various complex scenarios.

According to a first aspect of the present disclosure, there is provided a method for detecting a state of an earphone based on multiple sensors. The earphone includes a loudspeaker located in an auditory canal, a first voice pickup sensor located in the auditory canal and disposed near the loudspeaker, and a second voice pickup sensor located outside the auditory canal. The method includes the following operations.

First earphone state information is acquired according to a source audio signal input to the loudspeaker and a first audio signal picked up by the first voice pickup sensor.

Second earphone state information is acquired according to a second audio signal picked up by the second voice pickup sensor and the first audio signal picked up by the first voice pickup sensor.

A final detection result of the state of the earphone is output based on the first earphone state information and the second earphone state information.

According to a second aspect of the present disclosure, there is provided a device for detecting a state of an earphone based on multiple sensors. The earphone includes a loudspeaker located in an auditory canal, a first voice pickup sensor located in the auditory canal and disposed near the loudspeaker, and a second voice pickup sensor located outside the auditory canal. The device includes a first state acquisition module, a second state acquisition module and a state fusion output module.

The first state acquisition module is configured to acquire first earphone state information according to a source audio signal input to the loudspeaker and a first audio signal picked up by the first voice pickup sensor.

The second state acquisition module is configured to acquire second earphone state information according to a second audio signal picked up by the second voice pickup sensor and the first audio signal picked up by the first voice pickup sensor.

The state fusion output module is configured to output a final detection result of the state of the earphone based on the first earphone state information and the second earphone state information.

According to a third aspect of the present disclosure, there is provided an earphone. The earphone includes a memory and a processor, and the earphone further includes a loudspeaker located in an auditory canal, a first voice pickup sensor located in the auditory canal and disposed near the loudspeaker, and a second voice pickup sensor located outside the auditory canal. The memory is configured to store a computer program which, when being loaded and executed by the processor, causes the processor to perform the aforementioned method for detecting the state of the earphone based on multiple sensors.

According to a fourth aspect of the present disclosure, there is provided a computer-readable storage medium having stored thereon one or more computer programs which, when being executed by a processor, cause the processor to perform the aforementioned method for detecting the state of the earphone based on multiple sensors.

The embodiments of the present disclosure have the following beneficial effects.

In the embodiments of the present disclosure, detection of the state of the earphone is performed in combination with two types of relationships between signals, where a characteristic relationship between the signal input to the loudspeaker and the signal picked up by the first voice pickup sensor, that characterizes the leakage of the earphone under a low frequency condition, is used for acquiring the first earphone state information, and further a characteristic relationship between the signal picked up by the second voice pickup sensor and the signal picked up by the voice first voice pickup sensor, that characterizes the sound insulation effect of the earphone under the medium frequency and high frequency cases, is used for acquiring the second earphone state information. Then, the first earphone state information and the second earphone state information are fused to obtain and output the final detection result of the state of the earphone. Since two types of characteristic relationships between signals are combined for detection of the state of the earphone, the states of the earphone can be divided effectively in complex environments, thereby improving the accuracy of the earphone state detection.

BRIEF DESCRIPTION OF THE DRAWINGS

In order to more clearly illustrate the solution of embodiments of the present disclosure, the accompanying drawings required for description of the embodiments are briefly introduced below. It is apparent that the drawings in the following description are merely some embodiments disclosed by the present disclosure, a person having ordinary skill in the art can obtain other drawings according to these drawings. In the drawings.

DETAILED DESCRIPTION

Figure 1:
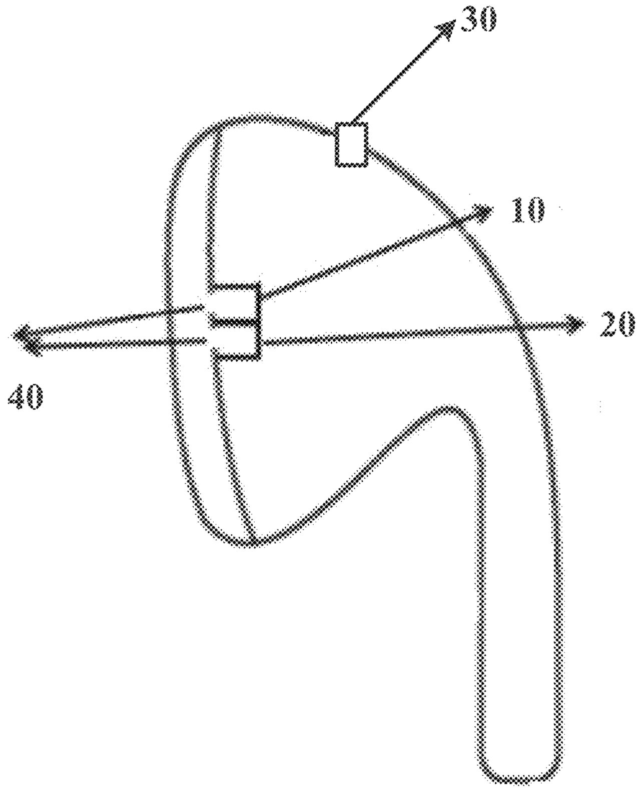
FIG. 1 illustrates a schematic structural diagram of an earphone in embodiments of the present disclosure.

Embodiments of the present disclosure will be described in more detail below with reference to the accompanying drawings. These embodiments are provided for more thorough understanding of the present disclosure and to fully deliver the scope of the present disclosure to those skilled in the art. While exemplary embodiments of the present disclosure are illustrated in the drawings, it should be understood that the present disclosure may be implemented in various forms and should not be limited by the embodiments set forth herein.

FIG. 1 illustrates a schematic structural diagram of an earphone in embodiments of the present disclosure. With reference to FIG. 1, the earphone in the following various embodiments includes a loudspeaker 10 located in an auditory canal, a first voice pickup sensor 20 located in the auditory canal and disposed near the loudspeaker 10, and a second voice pickup sensor 30 located outside the auditory canal. The loudspeaker 10 is an electro-acoustic converter, and the loudspeaker 10 located in the auditory canal and the first voice pickup sensor 20 are connected to outside through an acoustic transmission hole 40 on a housing of the earphone.

With the above position relationships, the first voice pickup sensor 20 is configured to pick up sound signals in the auditory canal (including an external noise signal leaking into the auditory canal, a sound signal played by the loudspeaker of the earphone, etc.), and the second voice pickup sensor is configured to pick up the external noise signal. In addition, the leakage of the earphone in the low-frequency condition may be characterized according to a signal relationship between a source audio signal input to the loudspeaker 10 and an audio signal picked up by the first voice pickup sensor 20. The sound insulation of the earphone in the medium and high frequency conditions may be characterized according to a signal relationship between an audio signal picked up by the second voice pickup sensor 30 and the audio signal picked up by the first voice pickup sensor 20.

Different couplings between the earphone and the auditory canal may have different characteristics on the earphone system. For example, under a normal wearing condition, when the coupling is good, a cavity formed by the earphone and the auditory canal has good sealing, and thus there is substantially no leakage for the earphone at low frequencies, and the earphone has a good sound insulation effect at the medium and high frequencies. When the coupling is poor, the cavity formed by the earphone and the auditory canal has poor sealing, and thus there is a large attenuation for the earphone at low frequencies, where the attenuation degrees are different under different couplings cases, and the earphone has a poor sound insulation effect at medium and high frequencies. In some abnormal states, for example, in a non-wearing state where the earphone is placed on a desktop, the audio output hole is fully open. For another example, the earphone is held in hand, and the earphone is located in a very small cavity, which may result in squealing. As this time, the characteristic relationship between signals is also distinctly different from that of the normal wearing state. For example, when the audio output hole of the earphone is fully open, the low-frequency amplitude may be lower, while during the squealing of the earphone, the high-frequency amplitude is very high, and its phase is significantly beyond a phase range in normal wearing state.

If it is determined that the earphone is in the abnormal squeal case at present, unexpected squeal may be suppressed by using various means, such as by controlling on or off of active noise cancellation (ANC) or controlling a gain of a noise canceling filter, to avoid the squeal in the abnormal state, or by turning off the ANC or reducing the noise reduction gain in the abnormal state.

In order to accurately detect the state of the earphone in various complex scenarios to perform a series of controlling on earphones, such as switching on or off of ANC, adjustment of ANC filter and audio compensation, detection of the state of the earphone is performed combined with multiple sensors in the present disclosure.

Figure 2:
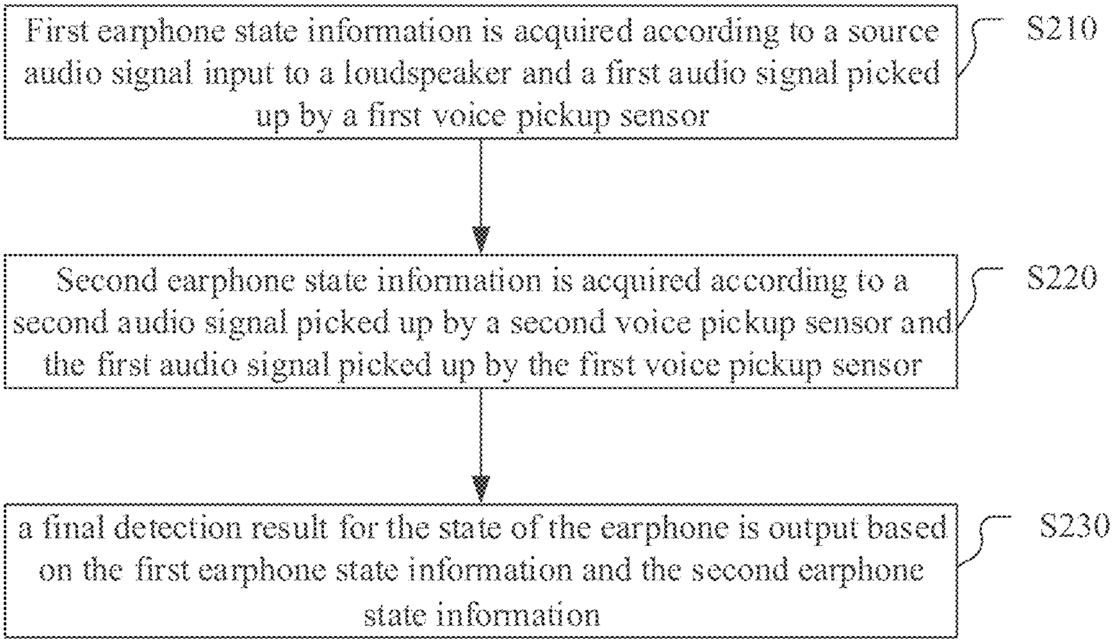
FIG. 2 illustrates a schematic flowchart of a method for detecting a state of an earphone based on multiple sensors in an embodiment of the present disclosure.

FIG. 2 illustrates a schematic flowchart of a method for detecting a state of an earphone based on multiple sensors in an embodiment of the present disclosure. As illustrated in FIG. 1, the method in the present disclosure includes the following operations S210 to S230.

At S210, first earphone state information is acquired according to a source audio signal input to a loudspeaker and a first audio signal picked up by a first voice pickup sensor.

At S220, second earphone state information is acquired according to a second audio signal picked up by a second voice pickup sensor and the first audio signal picked up by the first voice pickup sensor.

At S230, a final detection result of the state of the earphone is output based on the first earphone state information and the second earphone state information.

The above operations S210 and S220 are in a parallel relationship, and may be performed synchronously or asynchronously, and the operation S210 may be performed after the operation S220. At S230, the earphone state information obtained in operation S210 and the earphone state information obtained in operation S220 are fused for determination, and the final detection result of the state of the earphone is output.

Therefore, in the method of the present disclosure, detection of the state of the earphone is performed in combination with two types of relationships between signals, where a characteristic relationship between the signal input to the loudspeaker and the signal picked up by the first voice pickup sensor, that characterizes the leakage of the earphone under a low frequency condition, is used for acquiring the first earphone state information, and further a characteristic relationship between the signal picked up by the second voice pickup sensor and the signal picked up by the voice first voice pickup sensor, that characterizes the sound insulation effect of the earphone under the medium frequency and high frequency cases, is used for acquiring the second earphone state information. Then, the first earphone state information and the second earphone state information are fused to obtain and output the final detection result of the state of the earphone. Since two types of characteristic relationships between signals are combined for detection of the state of the earphone, the states of the earphone can be divided effectively in complex environments, thereby improving the accuracy of the earphone state detection.

In acoustic systems, a system transfer function (TF) is a preferred parameter for representing correlated components between two signals. The relationship between the signals may be amplitude-frequency characteristic or phase-frequency characteristic of the transfer function. In the above operations S210 and S220, in order to obtain the earphone state information, it is necessary to estimate the system transfer function between signals or the correlation function between signals. The methods for estimating the transfer function and the correlation function will be described below. The source audio signal sequence input to the loudspeaker and the second audio signal sequence picked up by the second voice pickup sensor are described in combination in order to avoid repeated description.

(1) Acquisition of signals for a current frame. One signal is the source audio signal sequence input to the loudspeaker (or the second audio signal sequence picked up by the second voice pickup sensor), denoted as x=[x(0), x(1), . . . , x(N−1)], and the other signal is the first audio signal sequence picked up by the first voice pickup sensor, denoted as y=[y(0), y(1), . . . , y(N−1)]. A high-pass filtering is performed on the two signal sequences to filter out the influence of a direct current signal.

(2) Windowing and frequency-domain transformation. The two signals are processed by applying an analysis window, such as a Hamming window (w=[w(0), w(1), . . . , w(N−1)]), and then the Fourier transform is performed to obtain frequency domain signals, denoted as X(k) and Y(k) respectively:

$$X(k)=\sum_{n=0}^{N-1}x(n)w(n)e^{-j2\pi/N}\ \ldots\ \ldots\ 0<=k<=N-1$$

$$Y(k)=\sum_{n=0}^{N-1}y(n)w(n)e^{-j2\pi/N}\ \ldots\ \ldots\ 0<=k<=N-1$$

where N represents a number of Fourier transform points, n represents sample points of a signal sequence, k represents a serial number of a frequency point bin, and bin represents a frequency interval or resolution for a frequency axis in a spectrogram.

(3) Calculation of auto-power spectrum and cross-power spectrum. Estimation of power spectrum may be performed by using a periodogram method. The auto-power spectrum Pxx(k) of the first one signal is calculated according to the formula as follows:

$$Pxx(k)=\frac{1}{N}|X(k)|^2$$

The auto-power spectrum Pyy(k) of the second signal is calculated according to the formula as follows:

$$Pyy(k)=\frac{1}{N}|Y(k)|^2$$

The cross-power spectrum Pyx(k) of the two signals are calculated as follows:

$$Pyx(k)=\frac{1}{N}Y(k)X^*(k)$$

where * represents conjugating.

(4) Determine whether the loudspeaker or the first or second voice pickup sensor receives a signal according to a size of the auto-power spectrum. If the auto-power spectrum is less than a certain threshold, such as −110 dB, then it is determined that the loudspeaker or the first or second voice pickup sensor receives no signal, and an abnormality may occur. If a signal is received, then the next calculation is carried out.

(5) Calculation of average power spectrum. Mean smoothing is performed on the power spectrum in a period of time, for example, a length of time LenT=30 frames. Then, the average auto-power spectrums PxxAve(k), PyyAve(k) and the average cross-power spectrum PyxAve (k) are calculated as follows:

$$PxxAve(k)=\frac{1}{LenT}\sum_{T=1}^{LenT}Pxx(k)$$

$$PyyAve(k)=\frac{1}{LenT}\sum_{T=1}^{LenT}Pyy(k)$$

$$PyxAve(k)=\frac{1}{LenT}\sum_{T=1}^{LenT}Pyx(k)$$

(6) Calculation of the frequency domain transfer function H(k) as follows:

$$H(k)=\frac{PyxAve(k)}{PxxAve(k)}$$

(7) Take an absolute value of the frequency domain transfer function, to obtain a corresponding amplitude-frequency response |H(k)|:

$$|H(k)|=\left|\frac{PyxAve(k)}{PxxAve(k)}\right|$$

(8) Calculate an average phase of the frequency domain transfer function by using the following formula, where imag function represents taking an imaginary part of a complex number, and the real function represents taking an real part of the complex number, $$\text{Phase}(H(k))=\arctan\left(\frac{imag(H(k))}{\text{real}(H(k))}\right)*180/Pi$$

(9) Calculate the correlation function according to the formula as follows, where abs represents taking the absolute value and sqrt represents taking the open root.

$$Cxy(k)=\text{abs}\left(\frac{PyxAve(k)}{sqrt(PxxAve(k)*PyyAve(k))}\right)$$

It is noted that the average correlation, the average amplitude, and the average phase corresponding to a sub-band in a predetermined frequency range are calculated by using the following formula:

$$subband=\frac{1}{EndFreBin-StartFreBin+1}\sum_{k=StartFreBin}^{k=EndFreBin}S(k)$$

where subband represents a calculation result for a sub-band, StartFreBin represents a starting frequency of the sub-band, and EndFreBin represents an ending frequency of the sub-band. A frequency range of the sub-band between StartFreBin and EndFreBin may be divided into multiple consecutive frequency points bin (a small frequency range), and S represents the correlation, amplitude or phase calculated at each frequency point bin.

Figure 3:
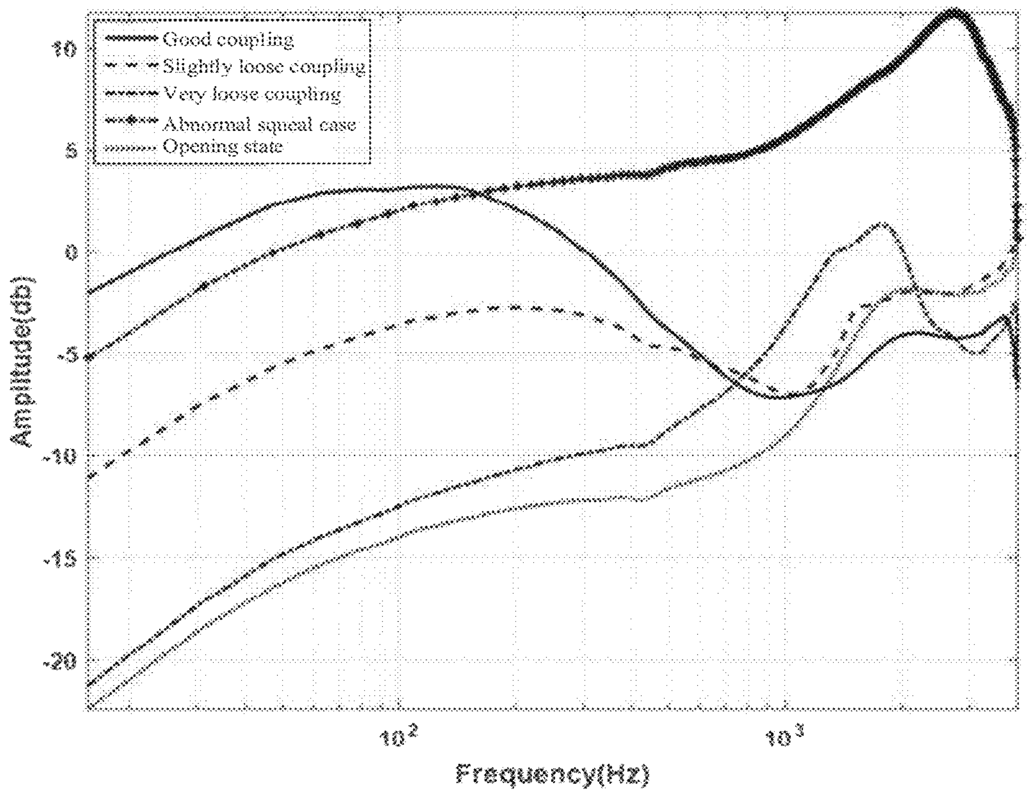
FIG. 3 illustrates amplitude-frequency responses of a transfer function between a source audio signal input to a loudspeaker and a first audio signal picked up by a first voice pickup sensor in different states.
Figure 4:
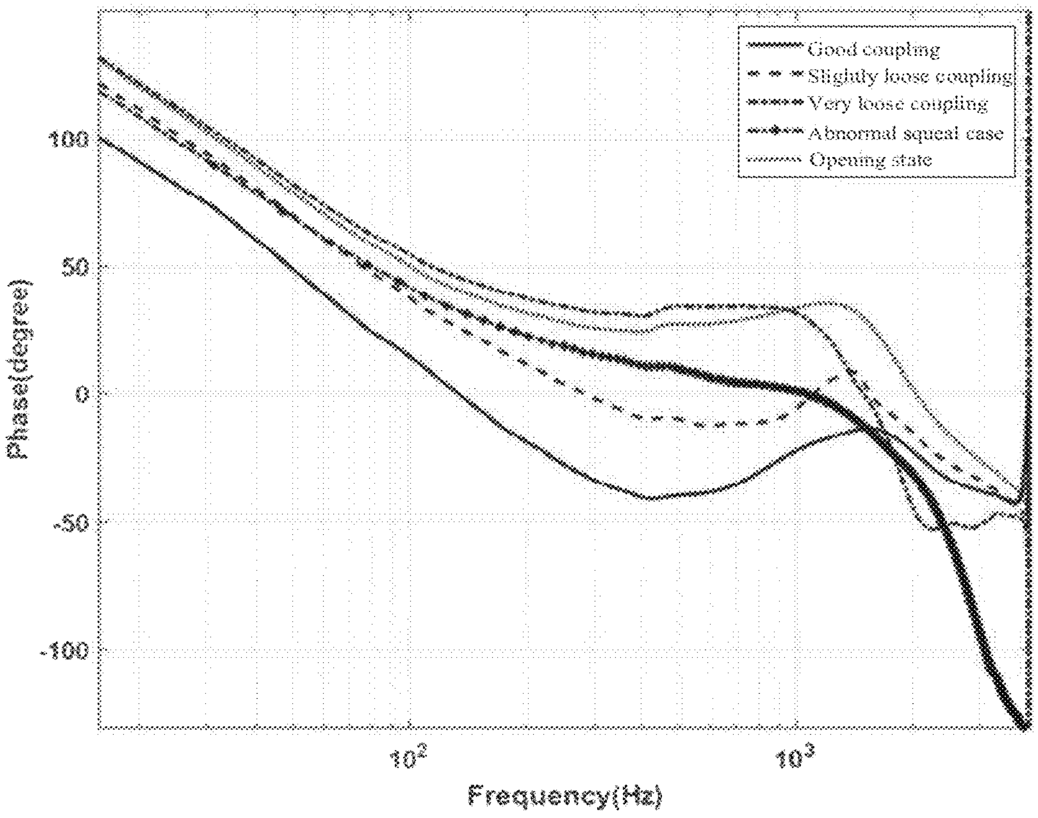
FIG. 4 illustrates phase-frequency responses of a transfer function between a source audio signal input to a loudspeaker and a first audio signal picked up by a first voice pickup sensor, in different states.
Figure 5:
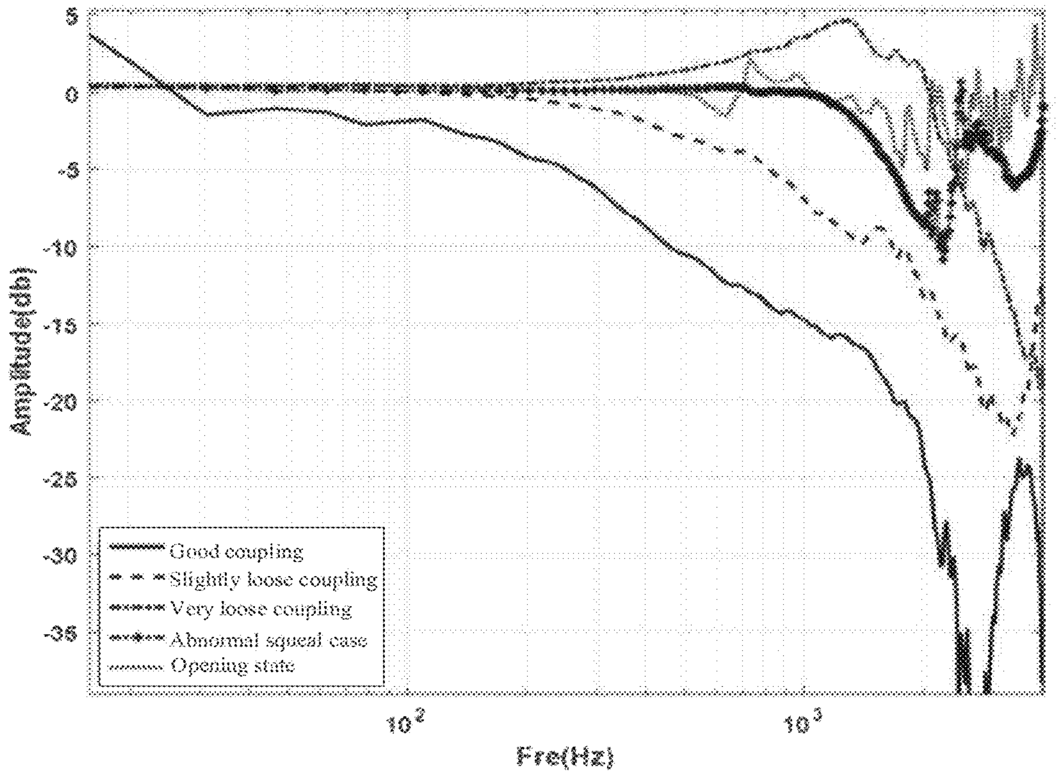
FIG. 5 illustrates amplitude-frequency responses of a transfer function between a second audio signal picked up by a second voice pickup sensor and a first audio signal picked up by a first voice pickup sensor in different states.
Figure 6:
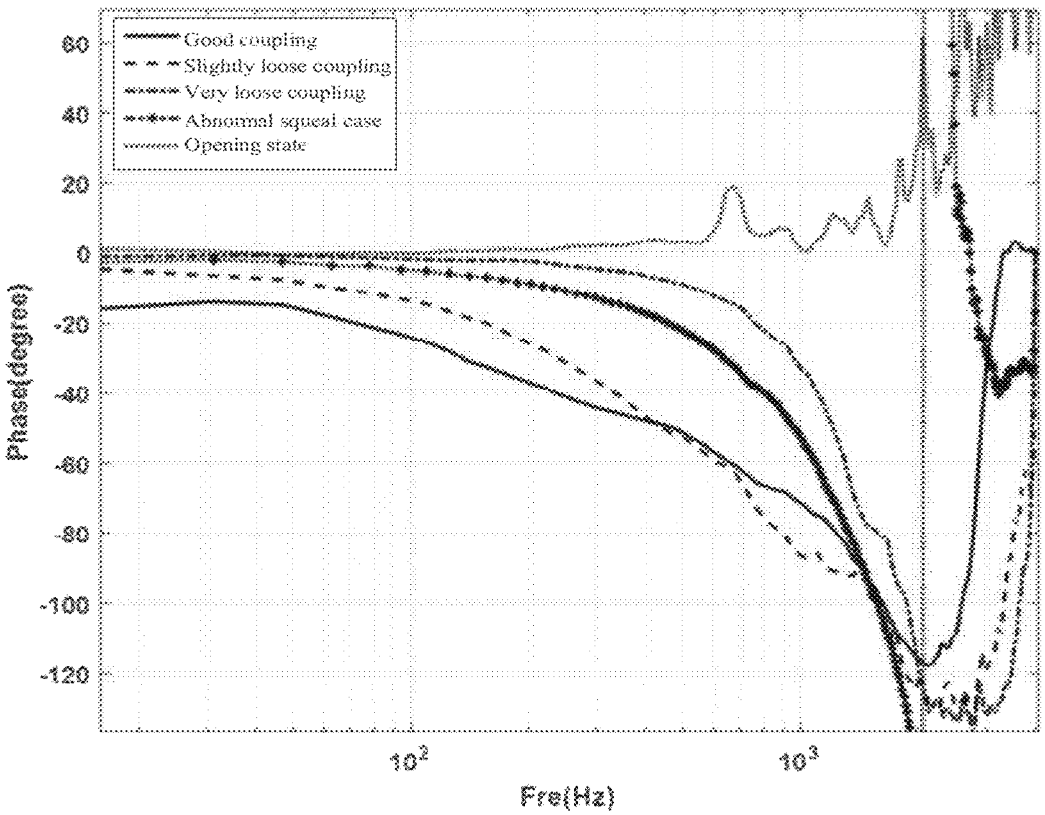
FIG. 6 illustrates phase-frequency responses of a transfer function between a second audio signal picked up by a second voice pickup sensor and a first audio signal picked up by a first voice pickup sensor in different states.

FIG. 3 illustrates amplitude-frequency responses of a transfer function between a source audio signal input to a loudspeaker and a first audio signal picked up by a first voice pickup sensor in different states. FIG. 4 illustrates phase-frequency responses of a transfer function between a source audio signal input to a loudspeaker and a first audio signal picked up by a first voice pickup sensor in different states. FIG. 5 illustrates amplitude-frequency responses of a transfer function between a second audio signal picked up by a second voice pickup sensor and a first audio signal picked up by a first voice pickup sensor in different states. FIG. 6 illustrates phase-frequency responses of a transfer functions between a second audio signal picked up by a second voice pickup sensor and a first audio signal picked up by a first voice pickup sensor in different states. It can be seen from these figures that, the transfer function between the source audio signal input to the loudspeaker and the first audio signal picked up by the first voice pickup sensor may have different performances in different states, and the transfer function between the second audio signal picked up by the second voice pickup sensor and the first audio signal picked up by the first voice pickup sensor may also have different performances in different states.

According to FIGS. 3 to 6, according to the solution of the present disclosure, the state of the earphone may be divided into two categories including: a normal wearing state and an abnormal state, where the normal wearing state is further divided into two coupling cases including: good coupling and slightly loose coupling, and the abnormal state is further divided into three cases including: very loose coupling, opening state and abnormal squeal case. The good coupling, slightly loose coupling and very loose coupling are three different situations when the earphone is worn. The opening state refers to a case where the sound hole of the earphone is completely exposed and substantially uncovered, for example, the earphone is placed on a desktop. The abnormal squeal case refers to a case where the earphone is located in a very small cavity which may cause an abnormal squeal, for example, the earphone is held in hand tightly.

It can be seen from the amplitude-frequency responses in FIG. 3 that, for the wearing state (which includes good coupling, slightly loose coupling, very loose coupling), the looser the coupling between the earphone and the auditory canal is, the greater the attenuation at low frequencies (such as frequencies below 400 Hz) is. For the opening state, the amplitude-frequency response is significantly attenuated in the medium frequency band (such as 300 Hz to 700 Hz) compared with the wearing state. For abnormal squeal case, the amplitude-frequency response is significantly raise at high frequencies, especially above 1000 Hz, compared with the wearing state, and there will be a risk of squeal due to the significant raise at high frequencies.

If the source audio signal input to the loudspeaker is a wide-band signal and has sufficient frequency information, firstly, whether it is an abnormal squeal case may be determined according to the amplitudes at high frequencies. For example, the abnormal squeal case may be determined when there are amplitudes exceeding a threshold TH1 in the frequency band from 1000 Hz to 4000 Hz. Then, whether it is an opening state may be determined according to the amplitudes at medium frequencies, for example, the opening state may be determined when there are amplitudes lower than a threshold TH2 in the frequency band from 300 Hz to 700 Hz. Finally, which coupling state in the wearing state it is may be determined according to the amplitudes at low frequencies. For example, the very loose coupling may be determined when the amplitudes are lower than a lowest threshold TH3, and the slightly loose coupling may be determined when the amplitudes are between the lowest threshold TH3 and second-lowest threshold TH4, and the good coupling may be determined when the amplitudes are greater than the second-lowest threshold TH4.

In practical applications, the source audio signal input to the loudspeaker may be of various types and may not be the wide-band signal. If the source audio signal input to the loudspeaker does not have enough medium frequency and high frequency components, such as percussion music or single/multi-frequency with low-frequencies, etc., the main component of which is mainly at low frequencies, such as frequencies lower than 200 Hz, then the opening state and abnormal squeal case cannot be distinguished based on the amplitudes only. At this situation, distinguishing between the abnormal squeal case and the wearing states can be effectively improved in combination with the phase information corresponding to low-frequencies as illustrated in FIG. 4. For example, the amplitudes at low frequencies are large and the phases at low frequencies are small in the case of good coupling, and the amplitudes at low frequencies are small and the phases at low frequencies are a bit small in the case of slightly loose coupling, while both the amplitudes and the phases at low frequencies are large in the case of abnormal squeal case. Further, in combination with the amplitudes and phases, in the medium and high frequencies, of the transfer function between the audio signal picked up by the first voice pickup sensor and the audio signal picked up by the second voice pickup sensor in FIGS. 5 and 6, the distinguishing of the abnormal squeal case and the wearing state can be further improved. For example, for the very loose coupling, it may have no sound insulation effect in the amplitude (with small amplitude attenuation), but has large phase attenuation, while for the abnormal squeal case, it has no sound insulation effect in the amplitude, but there is almost no phase attenuation at the low and medium frequencies (100 Hz to 1000 Hz).

In practical applications, the correlation between the source audio signal input to the loudspeaker and the first audio signal picked up by the first voice pickup sensor may be lower due to high external noise, making it impossible to estimate an effective transfer function, and thus the state of the earphone cannot be determined. Then, under this situation, a transfer function between the second audio signal picked up by the second voice pickup sensor and the first audio signal picked up by the first voice pickup sensor may be used to roughly distinguish among the good coupling, the slightly coupling in the normal wearing state, and the very loose coupling, the opening state and the abnormal squeal case in the abnormal state. For wearing conditions, the better the coupling is, the better the sound insulation effect at medium-high frequency (such as around 1000 Hz) is. That is, an amount of external noise obtained by the first voice pickup sensor is significantly less than that obtained by the second voice pickup sensor. Moreover, the external noise reaches the second voice pickup sensor first and then the first voice pickup sensor, which is reflected as phase attenuation in the phase-frequency response. However, in the wearing state with very loose coupling, the opening state and the abnormal squeal case, there is usually no sound insulation effect on the amplitude-frequency response, or the amplitude-frequency response may be raised in a certain frequency band. Therefore, the external signal may reach the first voice pickup sensor and the second voice pickup sensor almost at the same time, which is reflected as the phase being close to 0.

In the method of the present disclosure, the relationship between the source audio signal input to the loudspeaker and the first audio signal picked up by the first voice pickup sensor is used in combination with the relationship between the second audio signal picked up by the second voice pickup sensor and the first audio signal picked up by the first voice pickup sensor, which improves the accuracy of detection for various states of the earphone under complex scenarios, so that a series of controls or state adjustments can be carried out on the earphone according to different earphone states. For example, whether the earphone is worn on the ear can be detected, to perform determination or supplementary determination of in-ear detection. If the state of the earphone is the wearing state, an audio compensation may be performed according to different coupling cases, or a noise reduction filter may be selected or the noise reduction gain can be controlled to obtain a better noise reduction effect. If the state of the earphone is the non-wearing state, the ANC may be turned off to avoid generation of squeal, and audio playback may also be turned off to save power consumption. Optionally, some prompts may be given to users according to different states, such as inappropriate earplug, or abnormal earphone.

In addition, it is to be further explained that when the first voice pickup sensor fails, neither the first earphone state information nor the second earphone state information can be obtained, and thus the detection cannot be carried out. When the first voice pickup sensor is normal and one of the loudspeaker or the second voice pickup sensor is normal, the detection can be carried out but with a decreased accuracy of detection. In the process of performing operations S210 to S230 in the method of the present disclosure, when it is detected that no signal is input to the loudspeaker, execution of the operation S210 is stopped, and the second earphone state information obtained in S220 is directly output as the final detection result of the state of the earphone. When it is detected that no signal is picked up by the first voice pickup sensor, executions of the operations S210 and S220 are stopped, and a result prompting that the detection cannot be performed is output. When it is detected that no signal is picked up by the second voice pickup sensor, execution of the operation S220 is stopped, and the first earphone state information acquired in S210 is directly output as the final detection result of the state of the earphone. These settings can balance detection efficiency and detection feasibility in the case that the loudspeaker or the pickup sensor has failure.

Operations S210 to S230 will be described in detail below.

Figure 7:
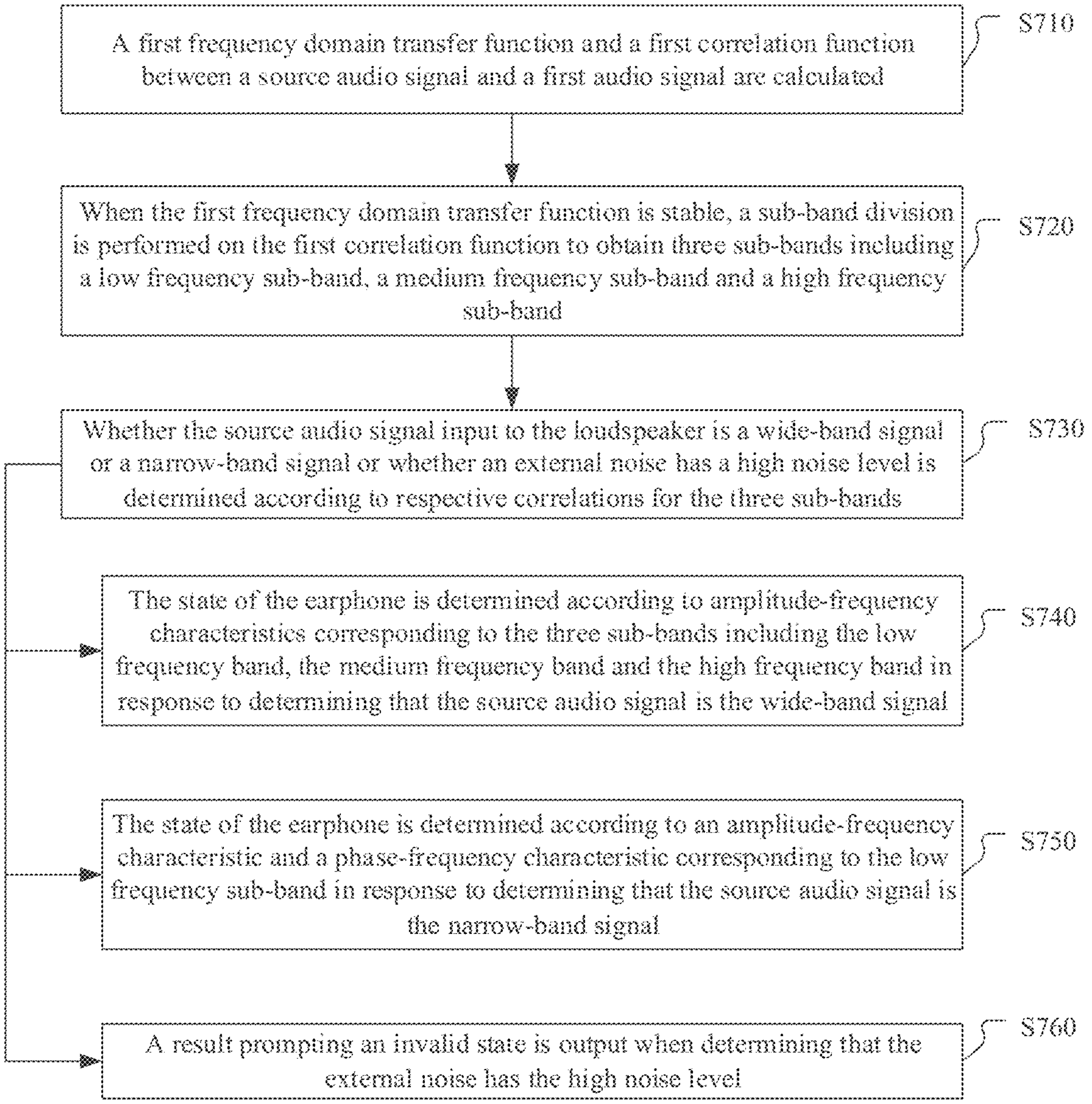
FIG. 7 illustrates a schematic flowchart of acquisition of first earphone state information in an embodiment of the present disclosure.
Figure 8:
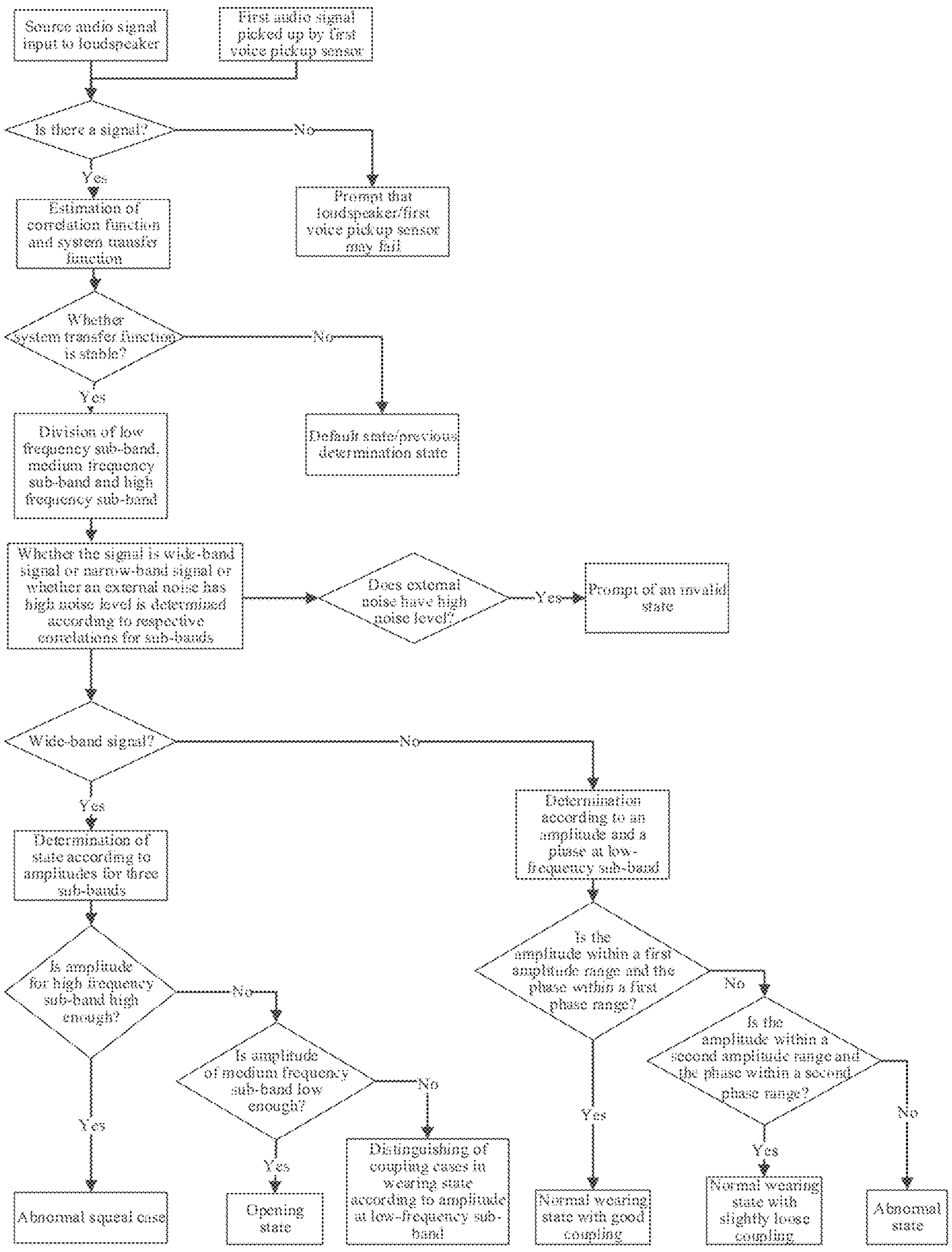
FIG. 8 illustrates a schematic diagram of a logical determination process corresponding to FIG. 7.

FIG. 7 illustrates a schematic flowchart of acquisition of first earphone state information in an embodiment of the present disclosure. FIG. 8 illustrates a schematic diagram of a logical determination process corresponding to FIG. 7. With reference to FIG. 7 and FIG. 8, the operation S210 that the first earphone state information is acquired according to the source audio signal input to the loudspeaker and the first audio signal picked up by the first voice pickup sensor may include the following operations S710 to S760.

At S710, a first frequency domain transfer function and a first correlation function between the source audio signal and the first audio signal are calculated.

In the operation S710, the first frequency domain transfer function and the first correlation function may be calculated by using the foregoing steps (1) to (9), which will not be elaborated herein again.

In addition, before the operation S710 is performed, it is necessary to determine whether there is a source audio signal input to the loudspeaker and whether there is a first audio signal picked up by the first voice pickup sensor in advance. If it is detected that no signal is input to the loudspeaker, a result prompting that the loudspeaker may fail is output, and the subsequent detection is terminated. If it is detected that no signal is picked up by the first voice pickup sensor, a result prompting that the first voice pickup sensor may fail is output, and the subsequent detection is terminated. Only when both the source audio signal and the first audio signal are detected, may the subsequent detection be continued.

At S720, a sub-band division is performed on the first correlation function to obtain three sub-bands including a low frequency sub-band, a medium frequency sub-band and a high frequency sub-band when the first frequency domain transfer function is stable.

At the operation S720, whether the transfer function is stable may be determined according to a value of the correlation function between signals or a variance of a transfer function. For example, it is determined that the transfer function is stable if a value of the first correlation function is higher than 0.8, or if a variance of the first frequency domain transfer function is less than 0.3. If the first frequency domain transfer function is unstable, a default state (e.g., good coupling) is output, or the previous determination result of the first earphone state information is output. In the solution of the present disclosure, the determination of the earphone wearing state is carried out continuously and in real time, so if a clear result cannot be given in this determination process, the previous determination result may be selected to be output as a default value.

When the first frequency domain transfer function is stable, the first correlation function is divided into multiple sub-bands, such as three sub-bands including: sub-band 1 from 100 Hz to 200 Hz, corresponding to the low frequency sub-band; sub-band 2 from 400 Hz to 700 Hz, corresponding to the medium frequency sub-band; sub-band 3 from 1000 Hz to 3000 Hz, corresponding to the high frequency sub-band. An average amplitude and an average phase are calculated for the three sub-bands, respectively, by using the foregoing steps (7) and (8).

At S730, whether the source audio signal input to the loudspeaker is a wide-band signal or a narrow-band signal or whether an external noise has a high noise level is determined according to respective correlations for the three sub-bands.

The operation S730 may specifically include the following operations. The source audio signal input to the loudspeaker is determined to be the wide-band signal when average correlations for the three sub-bands are all high. The source audio signal input to the loudspeaker is determined to be the narrow-band signal when only an average correlation for the low frequency sub-band is high. The external noise is determined to have high noise level when the average correlations for the three sub-bands are all low.

For example, if the average correlations for the three sub-bands are all high, for example, the average correlation for each of the three sub-bands is higher than 0.8, then the source audio signal input to the loudspeaker is determined as the wide-band signal. If only the average correlation for the sub-band 1 is high, for example, the average correlation for the sub-band 1 is higher than 0.8, then the source audio signal input to the loudspeaker is determined as the narrow-band signal. If the average correlations for the three sub-bands are all low, for example, the average correlation for each of the three sub-bands is lower than 0.3, then the external noise is determined to have high noise level.

At S740, the state of the earphone is determined according to amplitude-frequency characteristics corresponding to the three sub-bands including the low frequency band, the medium frequency band and the high frequency band when the source audio signal is determined to be the wide-band signal.

The operation S740 specifically includes the following operations. Whether an average amplitude of the first frequency domain transfer function corresponding to the high frequency sub-band is greater than a first amplitude threshold is determined, and the state of the earphone is determined to be an abnormal squeal case when the average amplitude of the first frequency domain transfer function corresponding to the high frequency sub-band is greater than the first amplitude threshold. Otherwise, it is further determined whether an average amplitude of the first frequency domain transfer function corresponding to the medium frequency sub-band is less than a second amplitude threshold, and the state of the earphone is determined to be an opening state when the average amplitude of the first frequency domain transfer function corresponding to the medium frequency sub-band is less than the second amplitude threshold. Otherwise, the state of the earphone is determined as a wearing state. Further, whether the wearing state has very loose coupling, or slightly loose coupling, or good coupling is determined according to the average amplitude of the first frequency domain transfer function corresponding to the low frequency sub-band.

For example, if the source audio signal is a wide-band signal, then the state of the earphone is determined according to the average amplitude for each of the sub-bands. If the average amplitude of sub-band 3 is higher than a certain threshold such as 0 dB, then the state of the earphone is determined to be the abnormal squeal case. Otherwise, the average amplitude of sub-band 2 is determined, and if the amplitude of the sub-band 2 is lower than a certain threshold such as −10 dB, then the state of the earphone is determined to be the opening state. Otherwise, the state of the earphone is determined to be the wearing state. Then, the coupling state is determined according to the average amplitude of sub-band 1. If the amplitude of the sub-band 1 is less than −10 dB, then the state of the earphone is determined to be very loose coupling, for example, the earphone may be loosely hung on the ear. If the amplitude of sub-band 1 is greater than or equal to −10 dB and less than −3 dB, then the state of the earphone is determined to be slightly loose coupling. If the amplitude of sub-band 1 is greater than or equal to −3 dB, then the state of the earphone is determined to be good coupling.

At S750, the state of the earphone is determined according to an amplitude-frequency characteristic and a phase-frequency characteristic of the first frequency transfer function corresponding to the low frequency sub-band when the source audio signal is determined to be the narrow-band signal.

The operation S750 specifically includes the following operations. An average amplitude and an average phase of the first frequency domain transfer function corresponding to the low frequency sub-band is acquired. The state of the earphone is determined to be a normal wearing state with good coupling when the average amplitude of the first frequency domain transfer function corresponding to the low frequency sub-band is within a preset first amplitude range and the average phase of the first frequency domain transfer function corresponding to the low frequency sub-band is within the a preset first phase range. The state of the earphone is determined to be a normal wearing state with slightly loose coupling when the average amplitude of the first frequency domain transfer function corresponding to the low frequency sub-band is within a preset second amplitude range and the average phase of the first frequency domain transfer function corresponding to the low frequency sub-band is within the a preset second phase range. Otherwise, the state of the earphone is determined to be an abnormal state.

For example, if the source audio signal is a narrow-band signal, then the state of the earphone is determined based on the average amplitude and average phase for sub-band 1. For example, if the average amplitude for the sub-band 1 is greater than or equal to −3 dB and less than 5 dB, and the average phase for the sub-band 1 is less than 3 degrees, then the state of the earphone is determined to be the wearing state with good coupling. If the average amplitude for the sub-band 1 is greater than or equal to −10 dB and less than-3 dB, and the average phase is greater than or equal to 3 degrees and less than 23 degrees, then the state of the earphone is determined to be the wearing state with slightly loose coupling. If these two situations are not met, then the state of the earphone is determined to be the abnormal state.

At S760, a result prompting an invalid state is output when determining that the external noise has the high noise level.

In situations where the external noise is high, the correlation between the source audio signal and the first audio signal is low, making it impossible to estimate an effective transfer function, and thus the wearing state of the earphone cannot be determined. At this time, the result prompting the invalid state is output.

Figure 9:
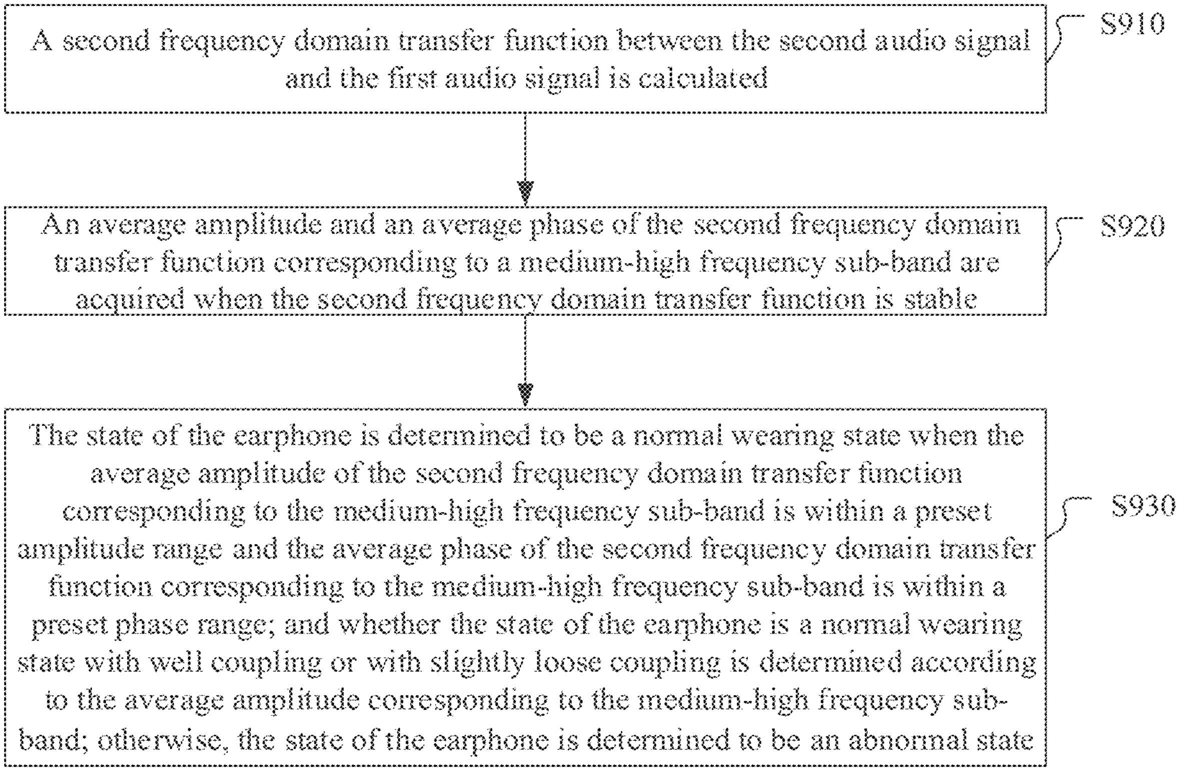
FIG. 9 illustrates a schematic flowchart of acquisition of second earphone state information in an embodiment of the present disclosure.
Figure 10:
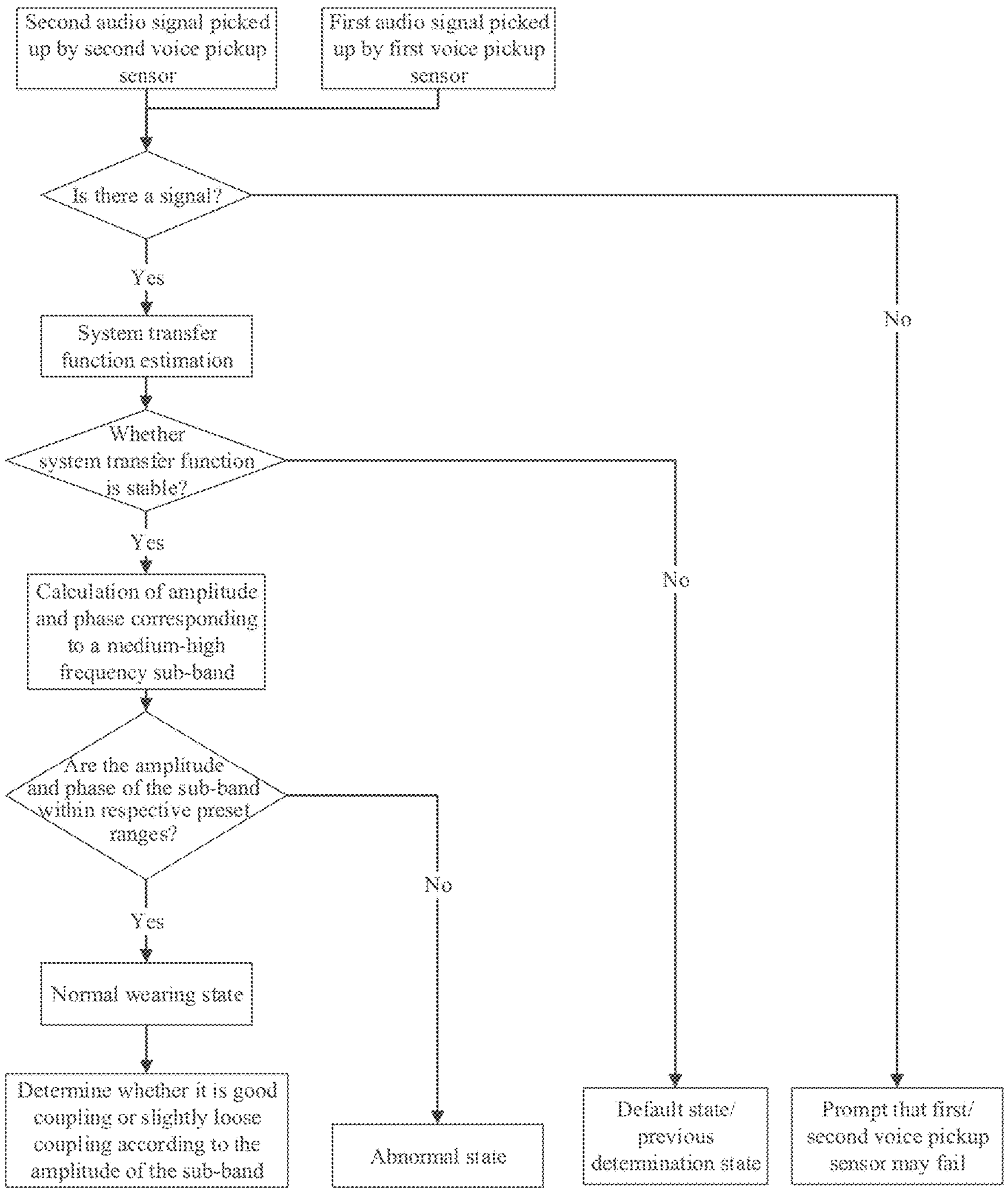
FIG. 10 illustrates a schematic diagram of a logical determination process corresponding to FIG. 9.

FIG. 9 illustrates a schematic flowchart of acquisition of second earphone state information in an embodiment of the present disclosure. FIG. 10 illustrates a schematic diagram of a logical determination process corresponding to FIG. 9.

With reference to FIG. 9 and FIG. 10, the above operation S220 that the second earphone state information is acquired according to the second audio signal picked up by the second voice pickup sensor and the first audio signal picked up by the first voice pickup sensor may include the following operations S910 to S930.

At S910, a second frequency domain transfer function between the second audio signal and the first audio signal is calculated.

In the operation S910, the second frequency domain transfer function may be calculated by using the foregoing steps (1) to (9), which will not be elaborated herein again.

In addition, before the operation S910 is performed, it is necessary to determine whether there is the second audio signal picked up by the second voice pickup sensor and whether there is the first audio signal picked up by the first voice pickup sensor in advance. If it is detected that no signal is picked up by the second voice pickup sensor, a result prompting that the second voice pickup sensor may fail is output, and the subsequent detection is terminated. If it is detected that no signal is picked up by the first voice pickup sensor, a result prompting that the first voice pickup sensor may fail is output, and the subsequent detection is terminated. Only when both the second audio signal and the first audio signal are detected, may the subsequent detection be continued.

At S920, an average amplitude and an average phase of the second frequency domain transfer function corresponding to a medium-high frequency sub-band are acquired when the second frequency domain transfer function is stable.

At the operation S920, whether a transfer function is stable may be determined according to a variance of the transfer function. For example, it is determined that the transfer function is stable if a variance of the second frequency domain transfer function is less than 0.3. If the second frequency domain transfer function is unstable, a default state (e.g., good coupling) is output, or the previous determination result of the second earphone state information is output.

When the second frequency domain transfer function is stable, as for a medium-high frequency sub-band, for example sub-band 4 from 600 Hz to 900 Hz, the average amplitude and the average phase are calculated for the sub-band 4 by using the aforementioned steps (7) and (8).

At S930, the state of the earphone is determined to be a normal wearing state when the average amplitude of the second frequency domain transfer function corresponding to the medium-high frequency sub-band is within a preset amplitude range and the average phase of the second frequency domain transfer function corresponding to the medium-high frequency sub-band is within a preset phase range; and whether the state of the earphone is a normal wearing state with good coupling or with slightly loose coupling is determined according to the average amplitude corresponding to the medium-high frequency sub-band; otherwise, the state of the earphone is determined to be an abnormal state.

For example, if the average amplitude and average phase of the sub-band 4 meet preset wearing conditions, for example, the average amplitude of the sub-band 4 is greater than −12 dB and less than −2 dB, and the average phase of the sub-band 4 is greater than −100 degrees and less than −18 degrees, then the state of the earphone is determined to be the normal wearing state; otherwise, it is the abnormal state. If the state of the earphone is the normal wearing state, the coupling case may be further determined according to the average amplitude of the sub-band 4. If the average amplitude of the sub-band 4 is less than −6 dB, then the coupling is determined to be good coupling, otherwise, the coupling is slightly loose coupling.

Figure 11:
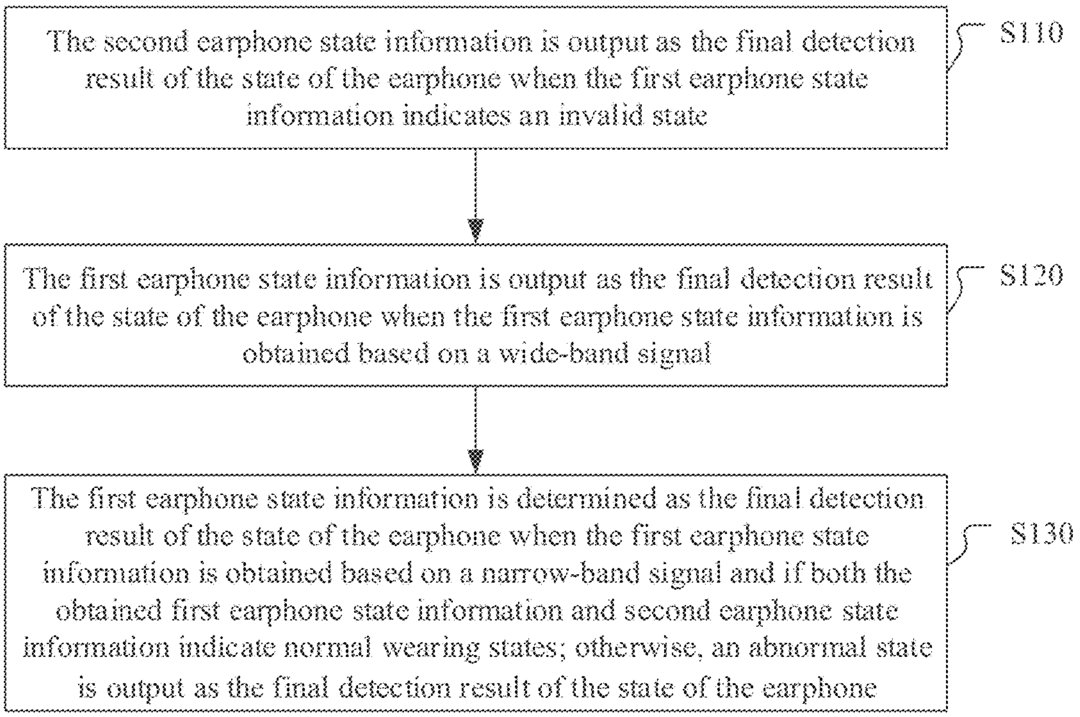
FIG. 11 illustrates a schematic flowchart of fusion of two types of earphone state information for outputting in an embodiment of the present disclosure.
Figure 12:
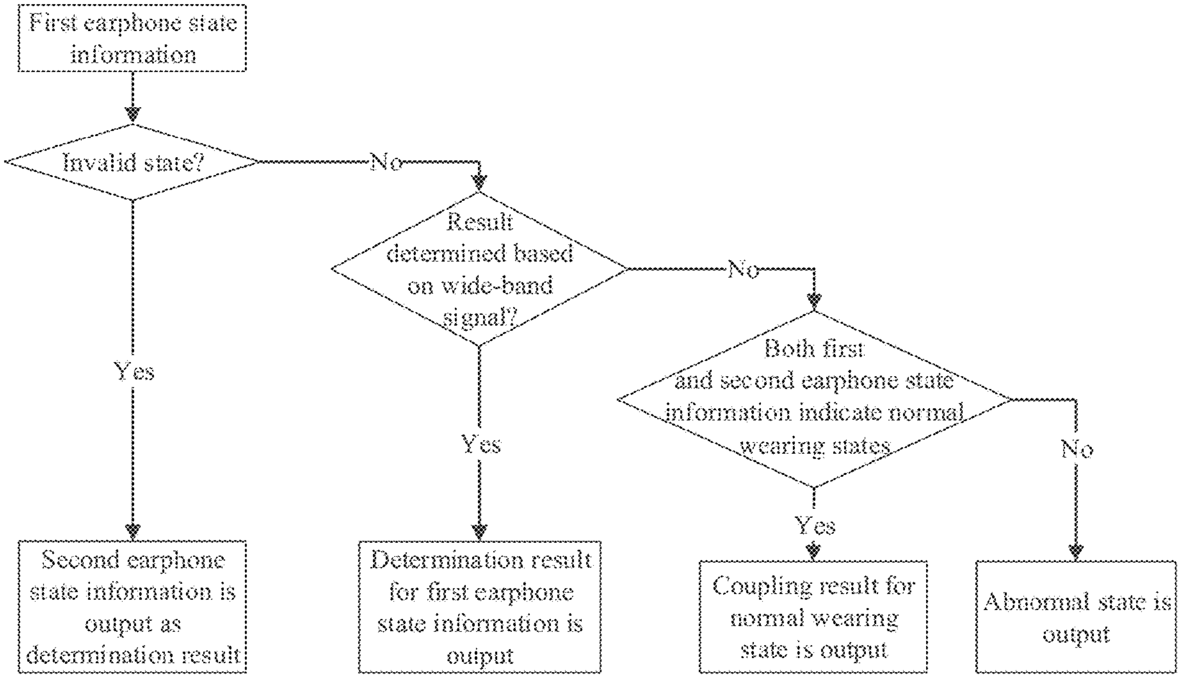
FIG. 12 illustrates a schematic diagram of a logical determination process corresponding to FIG. 11.

FIG. 11 illustrates a schematic flowchart of fusion of two types of earphone state information for outputting in an embodiment of the present disclosure. FIG. 12 illustrates a schematic diagram of a logical determination process corresponding to FIG. 11. With reference to FIG. 11 and FIG. 12, the operation S230 that the final detection result of the state of the earphone is output based on the first earphone state information and the second earphone state information specifically includes the operations S110 to S130.

At S110, the second earphone state information is output as the final detection result of the state of the earphone when the first earphone state information indicates an invalid state.

The operation S110 corresponds to the following scenario. The source audio signal input to the loudspeaker is either quiet or silent, and the external environment is noisy. The first voice pickup sensor picks up a signal from the loudspeaker that is seriously polluted by noise, and the first audio signal mainly consists of external noise. As a result, the characteristic relationship between the source audio signal and the first audio signal cannot be effectively obtained, so that the first earphone state information cannot be obtained. However, the characteristic relationship between the second audio signal picked up by the second voice pickup sensor and the first audio signal picked up by the first voice pickup sensor can be effectively obtained, and accordingly, the second earphone state information can be effectively obtained. Therefore, at the operation S110, whether the first earphone state information indicates an invalid state is determined first, and if so, the second earphone state information is directly output, otherwise, the process proceeds to operation S120.

At S120, the first earphone state information is output as the final detection result of the state of the earphone when the first earphone state information is obtained based on a wide-band signal.

The operation S120 corresponds to the following scenario. In a quiet environment, the first voice pickup sensor picks up signals primarily from the loudspeaker, making it easier to obtain the characteristic relationship between the source audio signal and the first audio signal, so as to perform determination of the earphone state. Therefore, when the first earphone state information indicates a valid state and the first earphone state information is obtained based on the wide-band signal, then the first earphone state information is directly output, otherwise, the process proceeds to operation S130.

At S130, the first earphone state information is determined as the final detection result of the state of the earphone when the first earphone state information is obtained based on a narrow-band signal and if both the obtained first earphone state information and second earphone state information indicate normal wearing states; otherwise, an abnormal state is output as the final detection result of the state of the earphone.

The operation S130 corresponds to the following scenario. When the signal input to the loudspeaker does not have sufficient information, for example, only containing low-frequency signal, the detection of the state of the earphone may be false. Then, the state of the earphone is determined further in combination with the characteristic relationship between the signal picked up by the second voice pickup sensor and the signal picked up the first voice pickup sensor, which can improve the accuracy of the detection. In addition, when both the first earphone state information and the second earphone state information indicate normal wearing states, a coupling state indicated by the first earphone state information is prioritized to be output. When the first earphone state information and the second earphone state information indicate different states, for example, the first earphone state information indicates the opening state and the second earphone state information indicates the abnormal state, the final detection result of the output state of the earphone is set as the abnormal state in order to avoid outputting an wrong earphone state.

In summary, according to the method for detecting the state of the earphone based on multiple sensors of the present disclosure, multiple states of the earphone are distinguished according to the multiple sensors, which can improve the distinction accuracy in complex scenarios. The multiple states of the earphone, including the wearing states with good coupling, slightly loose coupling and very loose coupling, the opening state, and the abnormal squeal case, etc., are distinguished according to the characteristic relationship between the source audio signal input to the loudspeaker and the first audio signal picked up by the first voice pickup sensor. In addition, the multiple states of the earphone, including the normal wearing states with good coupling and slightly loose coupling, and the abnormal state, etc., are further distinguished in combination with the characteristic relationship between the second audio signal picked up by the second voice pickup sensor and the first audio signal picked up by the first voice pickup sensor. In this way, the accuracy of distinction of states in complex scenarios can be improved, and thus functions of the earphone can be effectively controlled and adjusted by using the output result of the state of earphone according to product requirements.

Figure 13:
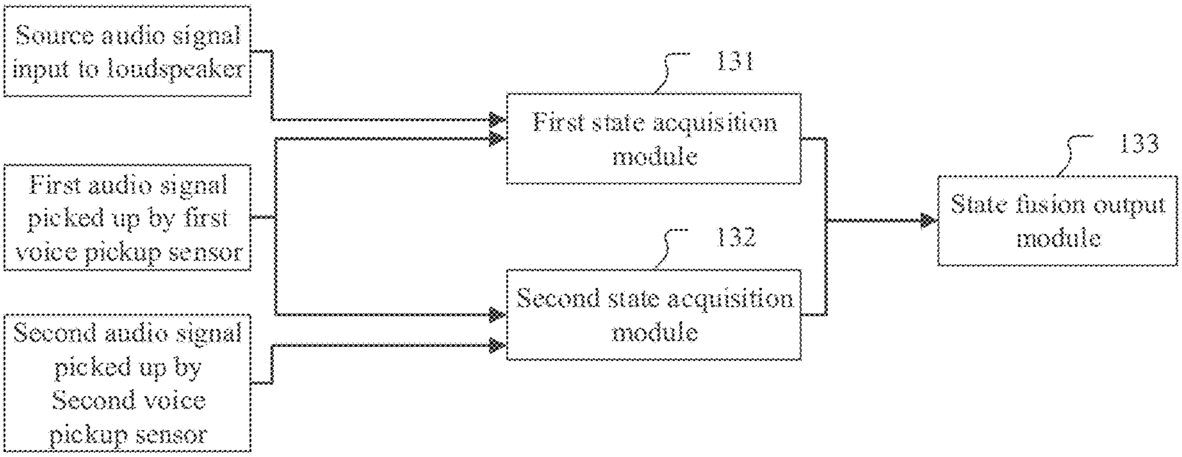
FIG. 13 illustrates a schematic structural diagram of a device for detecting a state of an earphone based on multiple sensors in an embodiment of the present disclosure.

The present disclosure also provides a device for detecting a state of an earphone based on multiple sensors, which belongs to the same technical concept as the foregoing method for detecting the state of the earphone based the multiple sensors. FIG. 13 illustrates a schematic structural diagram of a device for detecting a state of an earphone based on multiple sensors in an embodiment of the present disclosure. As illustrated in FIG. 13, the device includes a first state acquisition module 131, a second state acquisition module 132 and a state fusion output module 133.

The first state acquisition module 131 is configured to acquire first earphone state information according to a source audio signal input to a loudspeaker and a first audio signal picked up by a first voice pickup sensor.

The second state acquisition module 132 is configured to acquire second earphone state information according to a second audio signal picked up by the second voice pickup sensor and the first audio signal picked up by the first voice pickup sensor.

The state fusion output module 133 is configured to output a final detection result of the state of the earphone based on the first earphone state information and the second earphone state information.

Figure 14:
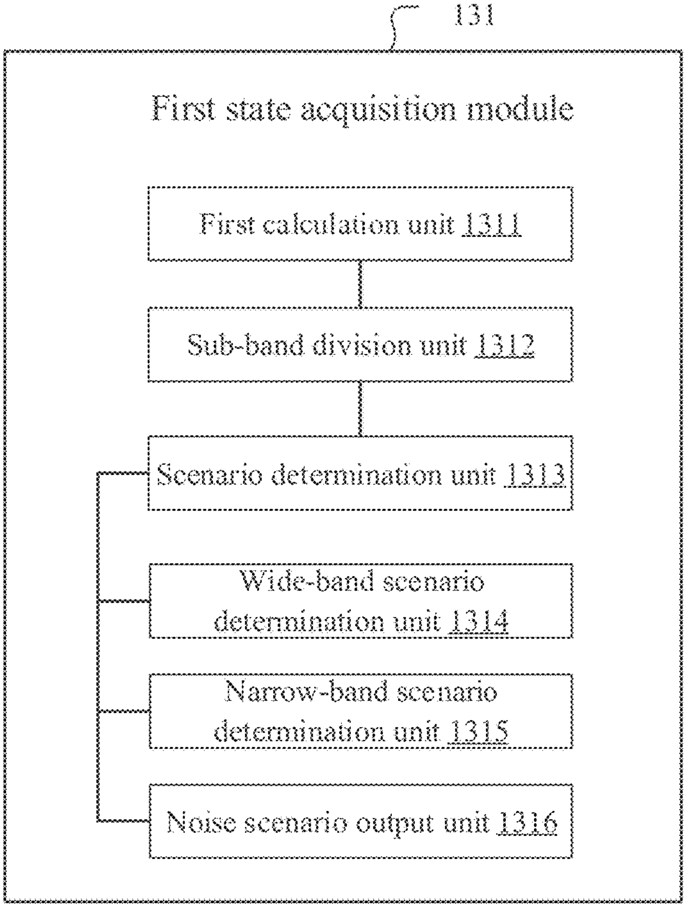
FIG. 14 illustrates a schematic structural diagram of a first state acquisition module in an embodiment of the present disclosure.

FIG. 14 illustrates a schematic structural diagram of a first state acquisition module in an embodiment of the present disclosure. As illustrated in FIG. 4, the first state acquisition module 131 includes a first calculation unit 1311, a sub-band division unit 1312, a scenario determination unit 1313, a wide-band scenario determination unit 1314, a narrow-band scenario determination unit 1315 and a noise scenario output unit 1316.

The first calculation unit 1311 is configured to calculate a first frequency domain transfer function and a first correlation function between the source audio signal and the first audio signal.

The sub-band division unit 1312 is configured to perform a sub-band division on the first correlation function to obtain three sub-bands including a low frequency sub-band, a medium frequency sub-band and a high frequency sub-band when the first frequency domain transfer function is stable.

The scenario determination unit 1313 is configured to determine whether the source audio signal input to the loudspeaker is a wide-band signal or a narrow-band signal or whether an external noise has a high noise level according to respective correlations for the three sub-bands.

The wide-band scenario determination unit 1314 is configured to determine the state of the earphone according to amplitude-frequency characteristics corresponding to the three sub-bands including the low frequency band, the medium frequency band and the high frequency band when the source audio signal is determined to be the wide-band signal.

The narrow-band scenario determination unit 1315 is configured to determine the state of the earphone according to an amplitude-frequency characteristic and a phase-frequency characteristic corresponding to the low frequency sub-band when the source audio signal is determined to be the narrow-band signal.

The noise scenario output unit 1316 is configured to output a result prompting an invalid state when the external noise is determined to have the high noise level.

In an embodiment, the scenario determination unit 1313 is specifically configured to: determine the source audio signal input to the loudspeaker to be the wide-band signal when average correlations for the three sub-bands are all high; determine the source audio signal input to the loudspeaker to be the narrow-band signal when only an average correlation for the low frequency sub-band is high; and determine the external noise to have the high noise level when the average correlations for the three sub-bands are all low.

In an embodiment, the wide-band scenario determination unit 1314 is configured to: determine whether an average amplitude of the first frequency domain transfer function corresponding to the high frequency sub-band is greater than a first amplitude threshold, and determine that the state of the earphone is an abnormal squeal case when the average amplitude of the first frequency domain transfer function corresponding to the high frequency sub-band is greater than the first amplitude threshold; otherwise, determine whether an average amplitude of the first frequency domain transfer function corresponding to the medium frequency sub-band is less than a second amplitude threshold, and determine that the state of the earphone is an opening state when the average amplitude of the first frequency domain transfer function corresponding to the medium frequency sub-band is less than the second amplitude threshold; otherwise, determine that the state of the earphone is a wearing state. The wide-band scenario determination unit 1314 is further configured to determine whether the wearing state has very loose coupling, or slightly loose coupling, or good coupling according to an average amplitude of the first frequency domain transfer function corresponding to the low frequency sub-band.

In an embodiment, the narrow-band scenario determination unit 1315 is specifically configured to: obtain an average amplitude and an average phase of the first frequency domain transfer function corresponding to the low frequency sub-band; determine that the state of the earphone is a normal wearing state with good coupling when the average amplitude of the first frequency domain transfer function corresponding to the low frequency sub-band is within a preset first amplitude range and the average phase of the first frequency domain transfer function corresponding to the low frequency sub-band is within the a preset first phase range; determine that the state of the earphone is a normal wearing state with slightly loose coupling when the average amplitude of the first frequency domain transfer function corresponding to the low frequency sub-band is within a preset second amplitude range and the average phase of the first frequency domain transfer function corresponding to the low frequency sub-band is within the a preset second phase range; otherwise, determine that the state of the earphone is an abnormal state.

Figure 15:
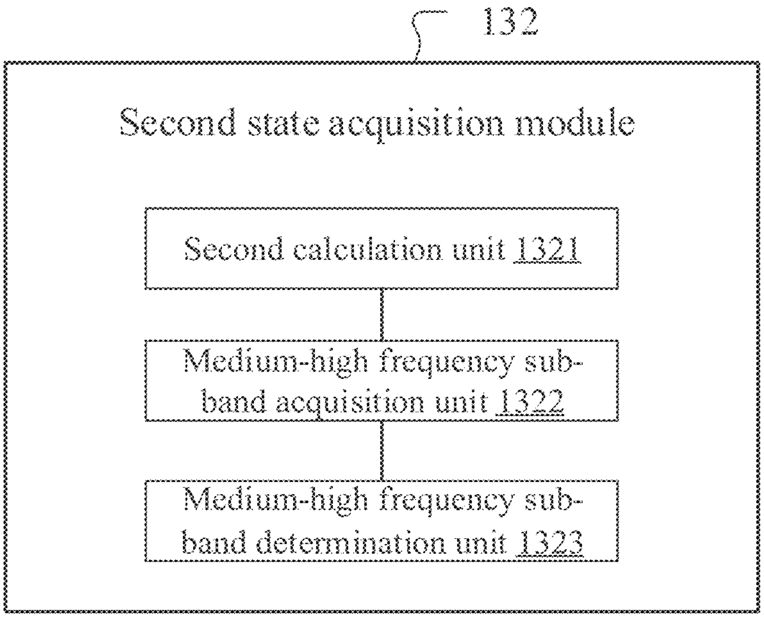
FIG. 15 illustrates a schematic structural diagram of a second state acquisition module in an embodiment of the present disclosure.

FIG. 15 illustrates a schematic structural diagram of a second state acquisition module in an embodiment of the present disclosure. As illustrated in FIG. 5, the second state acquisition module 132 includes a second calculation unit 1321, a medium-high frequency sub-band acquisition unit 1322 and a medium-high frequency sub-band determination unit 1323.

The second calculation unit 1321 is configured to calculate a second frequency domain transfer function between the second audio signal and the first audio signal.

The medium-high frequency sub-band acquisition unit 1322 is configured to acquire an average amplitude and an average phase of the second frequency domain transfer function corresponding to a medium-high frequency sub-band when the second frequency domain transfer function is stable.

The medium-high frequency sub-band determination unit 1323 is configured to: determine that the state of the earphone is a normal wearing state when the average amplitude of the second frequency domain transfer function corresponding to the medium-high frequency sub-band is within a preset amplitude range and the average phase of the second frequency domain transfer function corresponding to the medium-high frequency sub-band is within a preset phase range; and determine whether the state of the earphone is a normal wearing state with good coupling or with slightly loose coupling according to the average amplitude corresponding to the medium-high frequency sub-band; otherwise, determine that the state of the earphone is an abnormal state.

Figure 16:
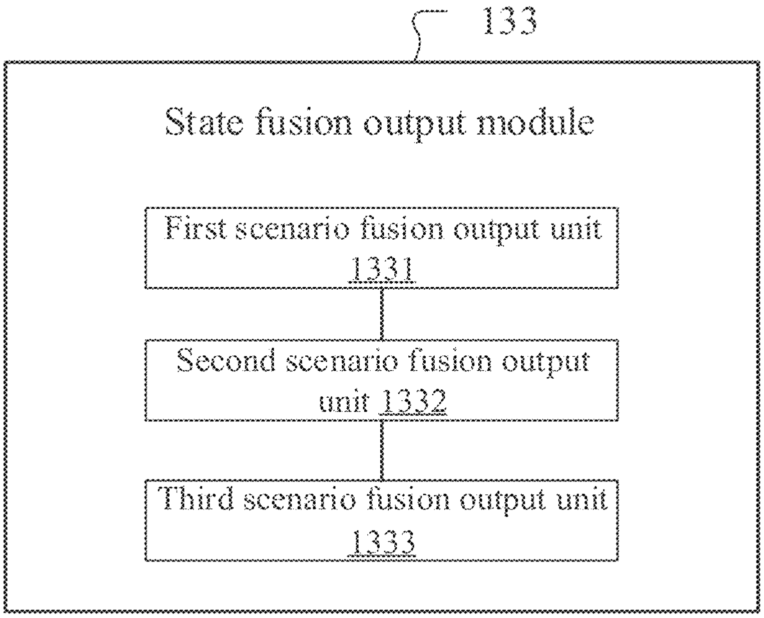
FIG. 16 illustrates a schematic structural diagram of a state fusion output module in an embodiment of the present disclosure.

FIG. 16 illustrates a schematic structural diagram of a state fusion output module in an embodiment of the present disclosure. As illustrated in FIG. 16, the state fusion output module 133 includes a first scenario fusion output unit 1331, a second scenario fusion output unit 1332 and a third scenario fusion output unit 1333.

The first scenario fusion output unit 1331 is configured to output the second earphone state information as the final detection result of the state of the earphone when the first earphone state information indicates an invalid state.

The second scenario fusion output unit 1332 is configured to output the first earphone state information as the final detection result of the state of the earphone when the first earphone state information is obtained based on a wide-band signal.

The third scenario fusion output unit 1333 is configured to output a coupling state in normal wearing of the earphone according to the first earphone state information, when the first earphone state information is obtained based on a narrow-band signal and if both the obtained first earphone state information and second earphone state information indicate normal wearing states; otherwise, output an abnormal state as the final detection result of the state of the earphone.

The implementation process of various modules or units in the device for detecting the state of the earphone based on multiple sensors of the present disclosure may be referred to the aforementioned method embodiments and will not be elaborated herein again.

It is to be understood that the modules or units used in the present disclosure may be implemented as a processor, and the processor is configured to execute computer instructions stored in a memory to implement the above method for detecting a state of an earphone in the embodiments of the present disclosure. For example, the first state acquisition module 131, the second state acquisition module 132 and the state fusion output module 133 may be implemented as a processor for performing corresponding method operations. Moreover, the method operations implemented by units included in each may also be implemented by the processor executing the computer instructions stored in the memory.

Figure 17:
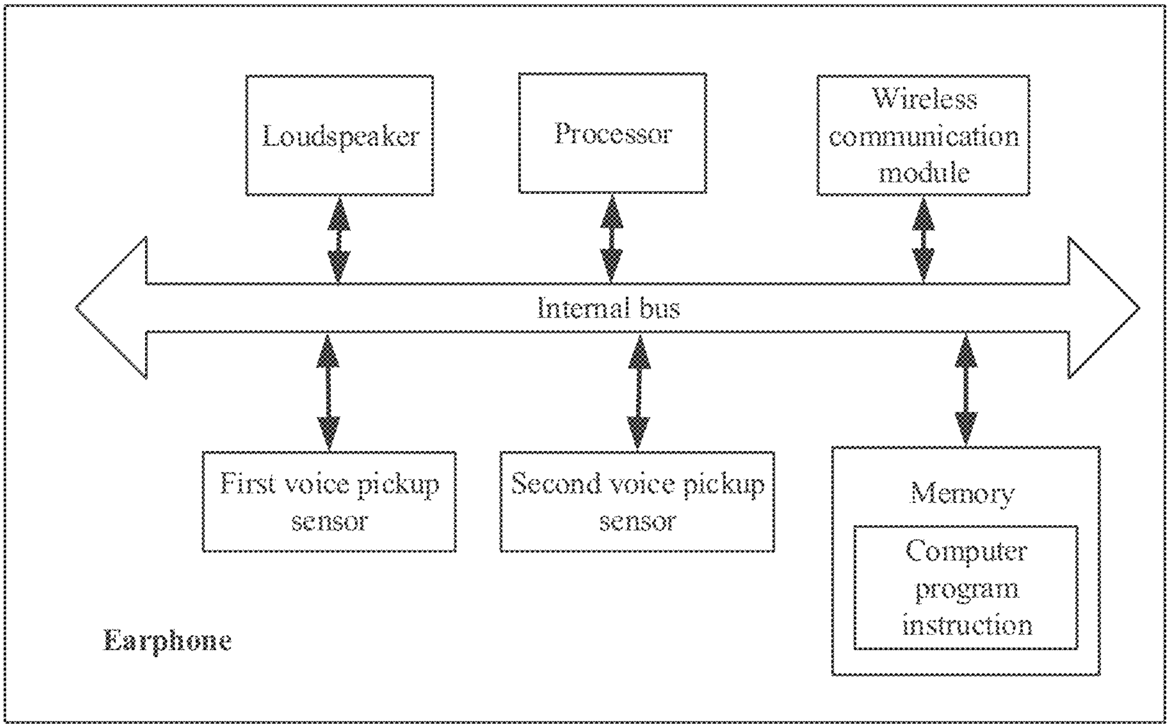
FIG. 17 illustrates a schematic structural diagram of an earphone in an embodiment of the present disclosure.

The present disclosure also provides an earphone, which belongs to the same technical concept as the foregoing method and device for detecting the state of the earphone based on the multiple sensors. FIG. 17 illustrates a schematic structural diagram of an earphone in an embodiment of the present disclosure. With reference to FIG. 17, the earphone in the present disclosure includes a memory and a processor, and the earphone further includes a loudspeaker located in an auditory canal, a first voice pickup sensor located in the auditory canal and disposed near the loudspeaker, and a second voice pickup sensor located outside the auditory canal. The memory is configured to store a computer program which, when being loaded and executed by the processor, causes the processor to perform the aforementioned method for detecting the state of the earphone based on multiple sensors, which will not be elaborated herein again.

At the hardware level, the earphone may also include a wireless communication module not limited to Bluetooth and wireless fidelity (WIFI). The memory, the processor, the loudspeaker, the first voice pickup sensor, the second voice pickup sensor, a wireless communication module, and the like may be interconnected through an internal bus. The internal bus may be an industry standard architecture (ISA) bus, a Peripheral Component Interconnect (PCI) bus, or an Extended ISA (EISA) bus. The bus may be divided into an address bus, a data bus, a control bus and the like. For ease of presentation, the bus is represented by a double-headed arrow in FIG. 17, but it does not mean that there is only one bus or one type of bus.

The present disclosure also provides a computer-readable storage medium having stored thereon one or more computer programs which, when being executed by a processor, cause the processor to perform the aforementioned method for detecting the state of the earphone based on multiple sensors, which will not be elaborated herein again.

Those skilled in the art should understand that embodiments of the present disclosure may be provided as a method, a device, an earphone or a computer program product. Accordingly, the disclosure may take the form of an entirely hardware embodiment, an entirely software embodiment or an embodiment combining software and hardware.

In is also to be noted that, the terms "including", "comprising", and any other variants thereof are intended to cover a non-exclusive inclusion. Therefore, in the context of a process, method, product, or device that includes a series of elements, the process, method, object, or device not only includes such elements, but also includes other elements not specified expressly, or may include inherent elements of the process, method, product, or device. Unless otherwise specified, an element limited by "including a/an . . . " does not exclude other same elements existing in the process, method, product, or device that includes the elements.

The foregoing description is only embodiments of the present disclosure and is not intended to limit the present disclosure. For those skilled in the art, the present disclosure may be subject to various modifications and variations. Any modification, equivalent and improvement within the spirit and principles of the present disclosure shall be covered in the scope of protection of the present disclosure.

What is claimed is:

1. A method for detecting a state of an earphone based on multiple sensors, wherein the earphone comprises a loudspeaker located in an auditory canal, a first voice pickup sensor located in the auditory canal and disposed near the loudspeaker, and a second voice pickup sensor located outside the auditory canal, and the method comprises:

acquiring first earphone state information according to a source audio signal input to the loudspeaker and a first audio signal picked up by the first voice pickup sensor;

acquiring second earphone state information according to a second audio signal picked up by the second voice pickup sensor and the first audio signal picked up by the first voice pickup sensor; and outputting a final detection result of the state of the earphone based on the first earphone state information and the second earphone state information, wherein acquiring the second earphone state information according to the second audio signal picked up by the second voice pickup sensor and the first audio signal picked up by the first voice pickup sensor comprises:

calculating a second frequency domain transfer function between the second audio signal and the first audio signal;

acquiring an average amplitude and an average phase of the second frequency domain transfer function corresponding to a medium-high frequency sub-band when the second frequency domain transfer function is stable; and determining that the state of the earphone is a normal wearing state when the average amplitude of the second frequency domain transfer function corresponding to the medium-high frequency sub-band is within a preset amplitude range and the average phase of the second frequency domain transfer function corresponding to the medium-high frequency sub-band is within a preset phase range; and determining that the state of the earphone is a normal wearing state with good coupling or with slightly loose coupling according to the average amplitude of the second frequency domain transfer function corresponding to the medium-high frequency sub-band; otherwise, determining that the state of the earphone is an abnormal state.

2. The method of claim 1, wherein outputting the final detection result of the state of the earphone based on the first earphone state information and the second earphone state information comprises:

outputting the second earphone state information as the final detection result of the state of the earphone when the first earphone state information indicates an invalid state;

outputting the first earphone state information as the final detection result of the state of the earphone when the first earphone state information is obtained based on a wide-band signal; and outputting the first earphone state information as the final detection result of the state of the earphone, when the first earphone state information is obtained based on a narrow-band signal and if both the obtained first earphone state information and second earphone state information indicate normal wearing states; otherwise, outputting an abnormal state as the final detection result of the state of the earphone.

3. The method of claim 1, wherein acquiring the first earphone state information according to the source audio signal input to the loudspeaker and the first audio signal picked up by the first voice pickup sensor comprises:

calculating a first frequency domain transfer function and a first correlation function between the source audio signal and the first audio signal;

performing a sub-band division on the first correlation function to obtain three sub-bands comprising a low frequency sub-band, a medium frequency sub-band and a high frequency sub-band when the first frequency domain transfer function is stable;

determining, according to respective correlations for the three sub-bands, whether the source audio signal input to the loudspeaker is a wide-band signal or a narrow-band signal, or whether an external noise has a high noise level;

determining the state of the earphone according to amplitude-frequency characteristics corresponding to the three sub-bands comprising the low frequency band, the medium frequency band and the high frequency band when determining that the source audio signal is the wide-band signal;

determining the state of the earphone according to an amplitude-frequency characteristic and a phase-frequency characteristic corresponding to the low frequency sub-band when determining that the source audio signal is the narrow-band signal; and outputting a result prompting an invalid state when determining that the external noise has the high noise level.

4. The method of claim 3, wherein determining, according to the respective correlations for the three sub-bands, whether the source audio signal input to the loudspeaker is the wide-band signal or the narrow-band signal, or whether the external noise has the high noise level comprises:

determining that the source audio signal input to the loudspeaker is the wide-band signal when average correlations for the three sub-bands are all high;

determining that the source audio signal input to the loudspeaker is the narrow-band signal when only an average correlation for the low frequency sub-band is high; and determining that the external noise has the high noise level when the average correlations for the three sub-bands are all low.

5. The method of claim 3, wherein determining the state of the earphone according to the amplitude-frequency characteristics corresponding to the three sub-bands comprising the low frequency band, the medium frequency band and the high frequency band when determining that the source audio signal is the wide-band signal comprises:

determining whether an average amplitude of the first frequency domain transfer function corresponding to the high frequency sub-band is greater than a first amplitude threshold, and determining that the state of the earphone is an abnormal squeal case when the average amplitude of the first frequency domain transfer function corresponding to the high frequency sub-band is greater than the first amplitude threshold; otherwise, determining whether an average amplitude of the first frequency domain transfer function corresponding to the medium frequency sub-band is less than a second amplitude threshold, and determining that the state of the earphone is an opening state when the average amplitude of the first frequency domain transfer function corresponding to the medium frequency sub-band is less than the second amplitude threshold; otherwise, determining that the state of the earphone is a wearing state, and further determining, according to an average amplitude of the first frequency domain transfer function corresponding to the low frequency sub-band, that the wearing state has very loose coupling, or slightly loose coupling, or good coupling.

6. The method of claim 3, wherein determining the state of the earphone according to the amplitude-frequency characteristic and the phase-frequency characteristic corresponding to the low frequency sub-band when determining that the source audio signal is the narrow-band signal comprises:

acquiring an average amplitude and an average phase of the first frequency domain transfer function corresponding to the low frequency sub-band;

determining that the state of the earphone is a normal wearing state with good coupling when the average amplitude of the first frequency domain transfer function corresponding to the low frequency sub-band is within a preset first amplitude range and the average phase of the first frequency domain transfer function corresponding to the low frequency sub-band is within the a preset first phase range;

determining that the state of the earphone is a normal wearing state with slightly loose coupling when the average amplitude of the first frequency domain transfer function corresponding to the low frequency sub-band is within a preset second amplitude range and the average phase of the first frequency domain transfer function corresponding to the low frequency sub-band is within the a preset second phase range;

otherwise, determining that the state of the earphone is an abnormal state.

7. A device for detecting a state of an earphone based on multiple sensors, wherein the earphone comprises a loudspeaker located in an auditory canal, a first voice pickup sensor located in the auditory canal and disposed near the loudspeaker, and a second voice pickup sensor located outside the auditory canal, and the device comprises:

a processor; and a memory for storing computer instructions executable by the processor, wherein the processor is configured to:

acquire first earphone state information according to a source audio signal input to the loudspeaker and a first audio signal picked up by the first voice pickup sensor;

acquire second earphone state information according to a second audio signal picked up by the second voice pickup sensor and the first audio signal picked up by the first voice pickup sensor; and output a final detection result of the state of the earphone based on the first earphone state information and the second earphone state information, wherein the processor is further configured to:

calculate a second frequency domain transfer function between the second audio signal and the first audio signal;

acquire an average amplitude and an average phase of the second frequency domain transfer function corresponding to a medium-high frequency sub-band when the second frequency domain transfer function is stable; and determine that the state of the earphone is a normal wearing state when the average amplitude of the second frequency domain transfer function corresponding to the medium-high frequency sub-band is within a preset amplitude range and the average phase of the second frequency domain transfer function corresponding to the medium-high frequency sub-band is within a preset phase range; and determine that the state of the earphone is a normal wearing state with good coupling or with slightly loose coupling according to the average amplitude of the second frequency domain transfer function corresponding to the medium-high frequency sub-band; otherwise, determine that the state of the earphone is an abnormal state.

8. The device of claim 7, wherein the processor is further configured to:

output the second earphone state information as the final detection result of the state of the earphone when the first earphone state information indicates an invalid state;

output the first earphone state information as the final detection result of the state of the earphone when the first earphone state information is obtained based on a wide-band signal; and output the first earphone state information as the final detection result of the state of the earphone, when the first earphone state information is obtained based on a narrow-band signal and if both the obtained first earphone state information and second earphone state information indicate normal wearing states; otherwise, output an abnormal state as the final detection result of the state of the earphone.

9. The device of claim 7, wherein the processor is further configured to:

calculate a first frequency domain transfer function and a first correlation function between the source audio signal and the first audio signal;

perform a sub-band division on the first correlation function to obtain three sub-bands comprising a low frequency sub-band, a medium frequency sub-band and a high frequency sub-band when the first frequency domain transfer function is stable;

determine, according to respective correlations for the three sub-bands, whether the source audio signal input to the loudspeaker is a wide-band signal or a narrow-band signal, or whether an external noise has a high noise level;

determine the state of the earphone according to amplitude-frequency characteristics corresponding to the three sub-bands comprising the low frequency band, the medium frequency band and the high frequency band when determining that the source audio signal is the wide-band signal;

determine the state of the earphone according to an amplitude-frequency characteristic and a phase-frequency characteristic corresponding to the low frequency sub-band when determining that the source audio signal is the narrow-band signal; and output a result prompting an invalid state in response to determining that the external noise has the high noise level.

10. The device of claim 9, wherein the processor is specifically configured to:

determine that the source audio signal input to the loudspeaker is the wide-band signal when average correlations for the three sub-bands are all high;

determine that the source audio signal input to the loudspeaker is the narrow-band signal when only an average correlation for the low frequency sub-band is high; and determine that the external noise has the high noise level when the average correlations for the three sub-bands are all low.

11. The device of claim 9, wherein the processor is specifically configured to:

determine whether an average amplitude of the first frequency domain transfer function corresponding to the high frequency sub-band is greater than a first amplitude threshold, and determine that the state of the earphone is an abnormal squeal case when the average amplitude of the first frequency domain transfer function corresponding to the high frequency sub-band is greater than the first amplitude threshold; otherwise, determine whether an average amplitude of the first frequency domain transfer function corresponding to the medium frequency sub-band is less than a second amplitude threshold, and determine that the state of the earphone is an opening state when the average amplitude of the first frequency domain transfer function corresponding to the medium frequency sub-band is less than the second amplitude threshold; otherwise, determine that the state of the earphone is a wearing state, and further determine, according to an average amplitude of the first frequency domain transfer function corresponding to the low frequency sub-band, that the wearing state has very loose coupling, or slightly loose coupling, or good coupling.

12. The device of claim 9, wherein the processor is specifically configured to:

acquire an average amplitude and an average phase of the first frequency domain transfer function corresponding to the low frequency sub-band;

determine that the state of the earphone is a normal wearing state with good coupling when the average amplitude of the first frequency domain transfer function corresponding to the low frequency sub-band is within a preset first amplitude range and the average phase of the first frequency domain transfer function corresponding to the low frequency sub-band is within the a preset first phase range;

determine that the state of the earphone is a normal wearing state with slightly loose coupling when the average amplitude of the first frequency domain transfer function corresponding to the low frequency sub-band is within a preset second amplitude range and the average phase of the first frequency domain transfer function corresponding to the low frequency sub-band is within the a preset second phase range;

otherwise, determine that the state of the earphone is an abnormal state.

13. A non-transitory computer-readable storage medium having stored thereon one or more computer programs which, when being executed by a processor, cause the processor to perform a method for detecting a state of an earphone based on multiple sensors, wherein the earphone comprises a loudspeaker located in an auditory canal, a first voice pickup sensor located in the auditory canal and disposed near the loudspeaker, and a second voice pickup sensor located outside the auditory canal, the method comprising:

acquiring first earphone state information according to a source audio signal input to the loudspeaker and a first audio signal picked up by the first voice pickup sensor;

acquiring second earphone state information according to a second audio signal picked up by the second voice pickup sensor and the first audio signal picked up by the first voice pickup sensor; and outputting a final detection result of the state of the earphone based on the first earphone state information and the second earphone state information, wherein the acquiring the second earphone state information according to the second audio signal picked up by the second voice pickup sensor and the first audio signal picked up by the first voice pickup sensor comprises:

calculating a second frequency domain transfer function between the second audio signal and the first audio signal;

acquiring an average amplitude and an average phase of the second frequency domain transfer function corresponding to a medium-high frequency sub-band when the second frequency domain transfer function is stable; and determining that the state of the earphone is a normal wearing state when the average amplitude of the second frequency domain transfer function corresponding to the medium-high frequency sub-band is within a preset amplitude range and the average phase of the second frequency domain transfer function corresponding to the medium-high frequency sub-band is within a preset phase range; and determining that the state of the earphone is a normal wearing state with good coupling or with slightly loose coupling according to the average amplitude of the second frequency domain transfer function corresponding to the medium-high frequency sub-band; otherwise, determining that the state of the earphone is an abnormal state.

14. The non-transitory computer-readable storage medium of claim 13, wherein outputting the final detection result of the state of the earphone based on the first earphone state information and the second earphone state information comprises:

outputting the second earphone state information as the final detection result of the state of the earphone when the first earphone state information indicates an invalid state;

outputting the first earphone state information as the final detection result of the state of the earphone when the first earphone state information is obtained based on a wide-band signal; and outputting the first earphone state information as the final detection result of the state of the earphone, when the first earphone state information is obtained based on a narrow-band signal and if both the obtained first earphone state information and second earphone state information indicate normal wearing states; otherwise, outputting an abnormal state as the final detection result of the state of the earphone.

15. The non-transitory computer-readable storage medium of claim 13, wherein acquiring the first earphone state information according to the source audio signal input to the loudspeaker and the first audio signal picked up by the first voice pickup sensor comprises:

calculating a first frequency domain transfer function and a first correlation function between the source audio signal and the first audio signal;

performing a sub-band division on the first correlation function to obtain three sub-bands comprising a low frequency sub-band, a medium frequency sub-band and a high frequency sub-band when the first frequency domain transfer function is stable;

determining, according to respective correlations for the three sub-bands, whether the source audio signal input to the loudspeaker is a wide-band signal or a narrow-band signal, or whether an external noise has a high noise level;

determining the state of the earphone according to amplitude-frequency characteristics corresponding to the three sub-bands comprising the low frequency band, the medium frequency band and the high frequency band when determining that the source audio signal is the wide-band signal;

determining the state of the earphone according to an amplitude-frequency characteristic and a phase-frequency characteristic corresponding to the low frequency sub-band when determining that the source audio signal is the narrow-band signal; and outputting a result prompting an invalid state when determining that the external noise has the high noise level.

16. The non-transitory computer-readable storage medium of claim 15, wherein determining, according to the respective correlations for the three sub-bands, whether the source audio signal input to the loudspeaker is the wide-band signal or the narrow-band signal, or whether the external noise has the high noise level comprises:

determining that the source audio signal input to the loudspeaker is the wide-band signal when average correlations for the three sub-bands are all high;

determining that the source audio signal input to the loudspeaker is the narrow-band signal when only an average correlation for the low frequency sub-band is high; and determining that the external noise has the high noise level when the average correlations for the three sub-bands are all low.

17. The non-transitory computer-readable storage medium of claim 15, wherein determining the state of the earphone according to the amplitude-frequency characteristics corresponding to the three sub-bands comprising the low frequency band, the medium frequency band and the high frequency band when determining that the source audio signal is the wide-band signal comprises:

determining whether an average amplitude of the first frequency domain transfer function corresponding to the high frequency sub-band is greater than a first amplitude threshold, and determining that the state of the earphone is an abnormal squeal case when the average amplitude of the first frequency domain transfer function corresponding to the high frequency sub-band is greater than the first amplitude threshold; otherwise, determining whether an average amplitude of the first frequency domain transfer function corresponding to the medium frequency sub-band is less than a second amplitude threshold, and determining that the state of the earphone is an opening state when the average amplitude of the first frequency domain transfer function corresponding to the medium frequency sub-band is less than the second amplitude threshold; otherwise, determining that the state of the earphone is a wearing state, and further determining, according to an average amplitude of the first frequency domain transfer function corresponding to the low frequency sub-band, that the wearing state has very loose coupling, or slightly loose coupling, or good coupling.

* * * * *